(12) United States Patent
Klemmer

(10) Patent No.: US 11,569,575 B2
(45) Date of Patent: Jan. 31, 2023

(54) LOW-COMPLEXITY BEAM STEERING IN ARRAY APERTURES

(71) Applicant: Samsung Electronics Co., Ltd., Suwon-si (KR)

(72) Inventor: Nikolaus Klemmer, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 352 days.

(21) Appl. No.: 16/677,520

(22) Filed: Nov. 7, 2019

(65) Prior Publication Data

US 2020/0358182 A1 Nov. 12, 2020

Related U.S. Application Data

(60) Provisional application No. 62/846,129, filed on May 10, 2019.

(51) Int. Cl.
| | | |
|---|---|---|
| *H01Q 3/00* | (2006.01) | |
| *H01Q 3/36* | (2006.01) | |
| *H01Q 3/28* | (2006.01) | |
| *H01Q 21/22* | (2006.01) | |
| *H01Q 21/06* | (2006.01) | |

(52) U.S. Cl.
CPC ............. *H01Q 3/36* (2013.01); *H01Q 3/28* (2013.01); *H01Q 21/061* (2013.01); *H01Q 21/22* (2013.01)

(58) Field of Classification Search
CPC .. H01Q 3/00; H01Q 3/01; H01Q 3/36; H01Q 3/28; H01Q 21/061; H01Q 21/22; H01Q 21/28

USPC .................................................. 342/368, 372
See application file for complete search history.

(56) References Cited

U.S. PATENT DOCUMENTS

| | | | |
|---|---|---|---|
| 4,692,768 A * | 9/1987 | Becavin | H01Q 3/40 342/368 |
| 5,017,931 A | 5/1991 | Carlyon | |
| 6,226,531 B1 * | 5/2001 | Holt | H01Q 1/246 342/380 |
| 6,965,343 B1 * | 11/2005 | Dybdal | H01Q 19/19 342/359 |
| 8,063,832 B1 | 11/2011 | Weller et al. | |

(Continued)

FOREIGN PATENT DOCUMENTS

| | | |
|---|---|---|
| KR | 10-2014-0048032 A | 4/2014 |
| KR | 10-2016-0018916 A | 2/2016 |

OTHER PUBLICATIONS

Shuangfeng Han, et al., "Large-Scale Antenna Systems with Hybrid Analog and Digital Beamforming for Millimeter Wave 5G", IEEE Comm. Mag., vol. 53-1, pp. 186-194, Jan. 2015.

(Continued)

*Primary Examiner* — Chuong P Nguyen

(57) ABSTRACT

A transceiver for low-complexity beam steering. The transceiver has a first antenna array including a first sub-aperture with a first native beam steering angle and a second antenna array including a second sub-aperture with a second native beam steering angle different than the first native beam steering angle. The first antenna array and the second antenna array are arranged in the transceiver such that the first sub-aperture is combinable with the second sub-aperture to form a combined aperture when the first antenna array and the second antenna array are excited.

18 Claims, 13 Drawing Sheets

(56) References Cited

U.S. PATENT DOCUMENTS

| | | | |
|---|---|---|---|
| 8,369,436 B2* | 2/2013 | Stirling-Gallacher | H04B 7/0408 375/267 |
| 8,427,370 B2* | 4/2013 | Pozgay | H01Q 3/26 342/372 |
| 8,611,455 B2* | 12/2013 | Stirling-Gallacher | H04B 7/0408 375/267 |
| 9,479,232 B1* | 10/2016 | Loui | H04B 7/0617 |
| 9,768,501 B2* | 9/2017 | Maltsev | H01Q 3/00 |
| 9,923,271 B2* | 3/2018 | Hyde | H01Q 15/0006 |
| 10,243,412 B1* | 3/2019 | Fink | H04B 7/0456 |
| 10,601,131 B2* | 3/2020 | Li | H01Q 3/26 |
| 11,218,203 B1* | 1/2022 | Lee | H04B 7/0617 |
| 2008/0284641 A1 | 11/2008 | Spreadbury | |
| 2010/0052986 A1* | 3/2010 | Nink | H01Q 21/28 342/372 |
| 2013/0300602 A1 | 11/2013 | Zhou et al. | |
| 2014/0106807 A1 | 4/2014 | Bang et al. | |
| 2016/0226570 A1 | 8/2016 | Nicholls et al. | |
| 2016/0233588 A1* | 8/2016 | Bily | H01Q 21/065 |
| 2016/0261043 A1 | 9/2016 | Sazegar et al. | |
| 2016/0268681 A1* | 9/2016 | Hoole | H01Q 3/2605 |
| 2018/0048063 A1 | 2/2018 | Hallivuori | |
| 2018/0123239 A1 | 5/2018 | Long et al. | |
| 2021/0376461 A1* | 12/2021 | Dallal | H01Q 3/40 |

OTHER PUBLICATIONS

Andreas F. Molisch, et al., "Hybrid Beamforming for Massive MIMO: A Survey", IEEE Comm. Mag., vol. 55-9, pp. 134-141, Sep. 2017.

Constantine A. Balanis, "Antenna Theory: Analysis and Design", 3rd Ed., Ch. 6: Arrays: Linear, Planar and Circular, Wiley-Interscience, pp. 283-338, 2005.

Tae-Yeoul Yun, et al., "A Low-Cost 8 to 26.5 GHz Phased Array Antenna Using a Piezoelectric Transducer Controlled Phase Shifter", IEEE Trans Antennas and Propagation, vol. 49, No. 9, pp. 1290-1298, Sep. 2001.

Danial Ehyaie, et al., "A New Approach to Design Low Cost, Low Complexity Phased Arrays", 2010 IEEE MTT-S Int. Microwave Symp., May 23-28, 2010, pp. 1270-1273, Anaheim, CA.

Eray Topak, et al., "A Novel Millimeter-Wave Dual-Fed Phased Array for Beam Steering", IEEE Trans. Microwave Theory Techniques, vol. 61, No. 8, pp. 3140-3147, Aug. 2013.

Mohsen Khalily, et al., "Design of Phased Arrays of Series-Fed Patch Antennas With Reduced Number of the Controllers for 28-GHz mm-Wave Applications", IEEE Antennas and Wireless Propagation Letters, vol. 15, pp. 1305-1308, 2016.

International Search Report of the International Searching Authority in connection with International Application No. PCT/KR2020/006181 dated Aug. 26, 2020, 4 pages.

Extended European Search Report dated Mar. 23, 2022 regarding Application No. 20806347.9, 11 pages.

* cited by examiner

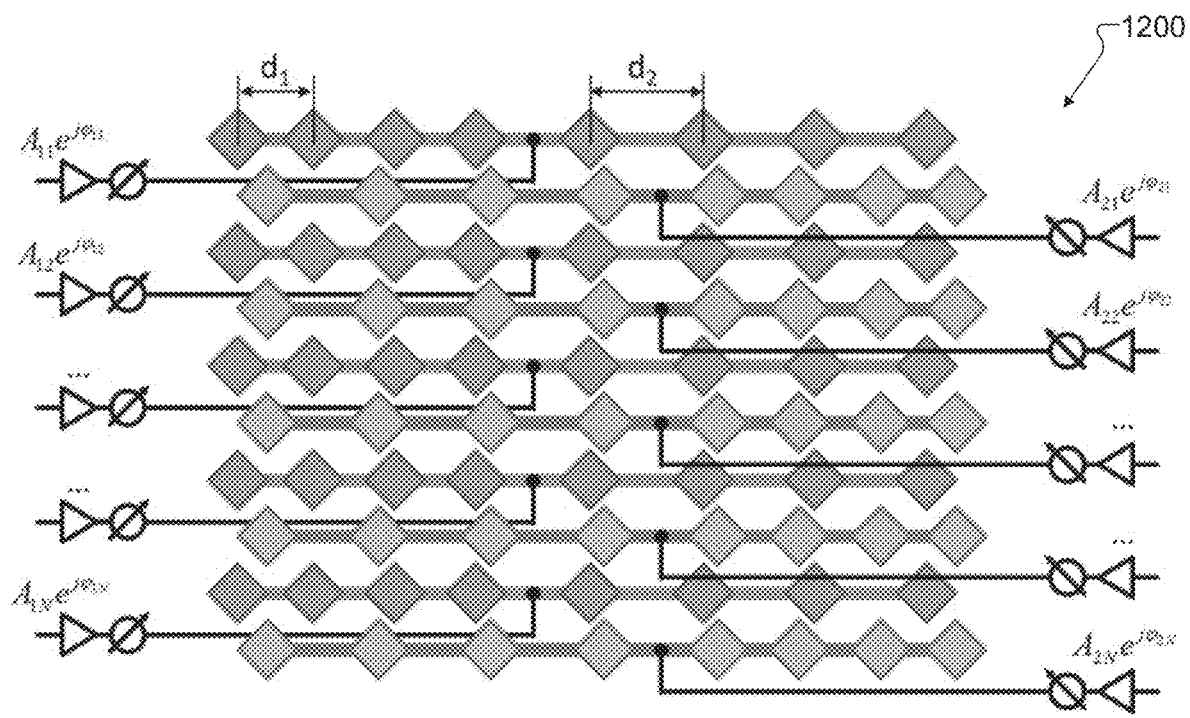
FIG. 12
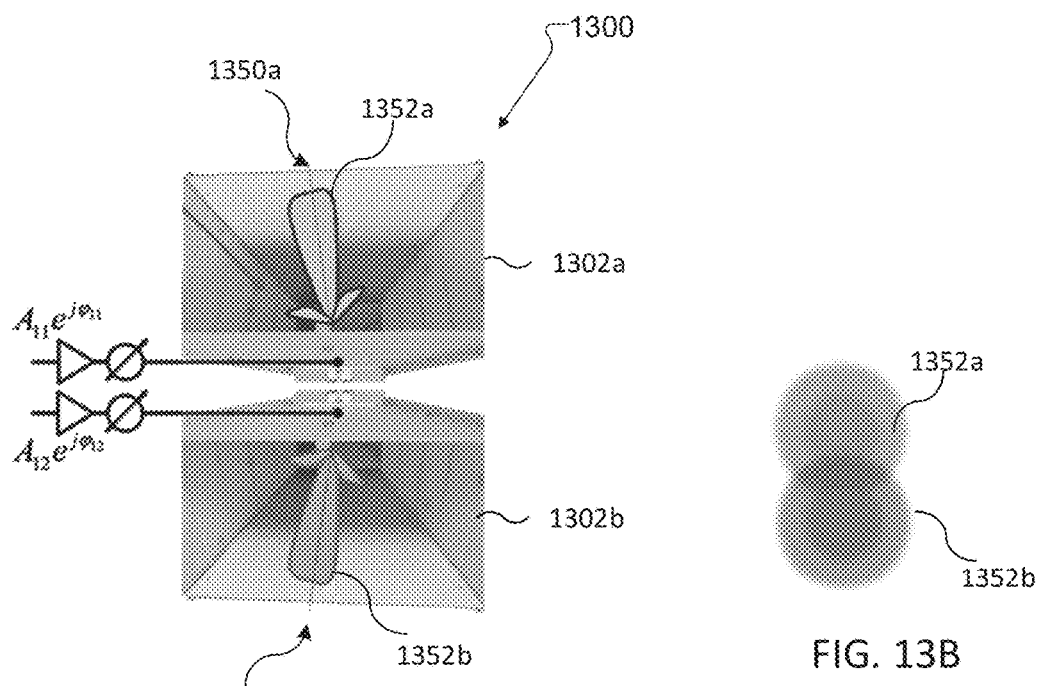
FIG. 13A
FIG. 13B

LOW-COMPLEXITY BEAM STEERING IN ARRAY APERTURES

CROSS-REFERENCE TO RELATED APPLICATION AND CLAIM OF PRIORITY

This application claims priority under 35 U.S.C. § 119(e) to U.S. Provisional Patent Application No. 62/846,129 filed on May 10, 2019. The above-identified provisional patent application is hereby incorporated by reference in its entirety.

TECHNICAL FIELD

The present application relates generally to phased antennas, and more particularly to a transceiver with a simplified antenna aperture implementation capable of two-dimensional beam steering.

BACKGROUND

Two-directional beam steering for phased array antennas can be used for communications applications as well as radar applications. Examples of communications applications include point-to-point wireless backhaul, point-to-multipoint fixed wireless installations, wireless infrastructure mesh network, and others. Non-limiting examples of radar applications include automotive long-range radar, indoor robotic navigation, and others.

One conventional type of beam steering technique involves electro-mechanical phase control, but only allows control of a single beam. In addition, it is difficult to extend to a larger number of elements in a one-dimensional (1D) array, it is not viable for two-dimensional (2D) arrays, and it is susceptible to mechanical tolerances and sensitive to shock and vibration. Another type of conventional beam steering involves summing a forward signal with a reverse signal reflected from a phase shifter at the end of a main transmission line to determine phase shifts. However, this method requires a larger number of amplifiers and can only be used to steer a single beam.

SUMMARY

Embodiments of the present disclosure include a method and a transceiver for low complexity beam steering. In one embodiment, the transceiver has a first antenna array including a first sub-aperture with a first native beam steering angle and a second antenna array including a second sub-aperture with a second native beam steering angle different than the first native beam steering angle. The first antenna array and the second antenna array are arranged in the transceiver such that the first sub-aperture is combinable with the second sub-aperture to form a combined aperture when the first antenna array and the second antenna array are excited.

In another embodiment, a method for low complexity beam steering by a transceiver is disclosed. First driving signals are sent to a first antenna array including a first sub-aperture with a first native beam steering angle, and second driving signals are sent to a second antenna array including a second sub-aperture with a second native beam steering angle. The first antenna array and the second antenna array are arranged in the transceiver such that the first sub-aperture is combinable with the second sub-aperture to form a combined aperture when the first driving signals and the second driving signals excite the first and second antenna arrays, respectively.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. Likewise, the term "set" means one or more. Accordingly, a set of items can be a single item or a collection of two or more items.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIG. 12 illustrates a composite, center-fed 2N×M array formed from a first antenna array and a second antenna array according to various embodiments of this disclosure;

FIGS. 13A and 13B illustrate single-element, large aperture antennas and the corresponding far field beams according to various embodiments of this disclosure;

DETAILED DESCRIPTION

Figure 1:
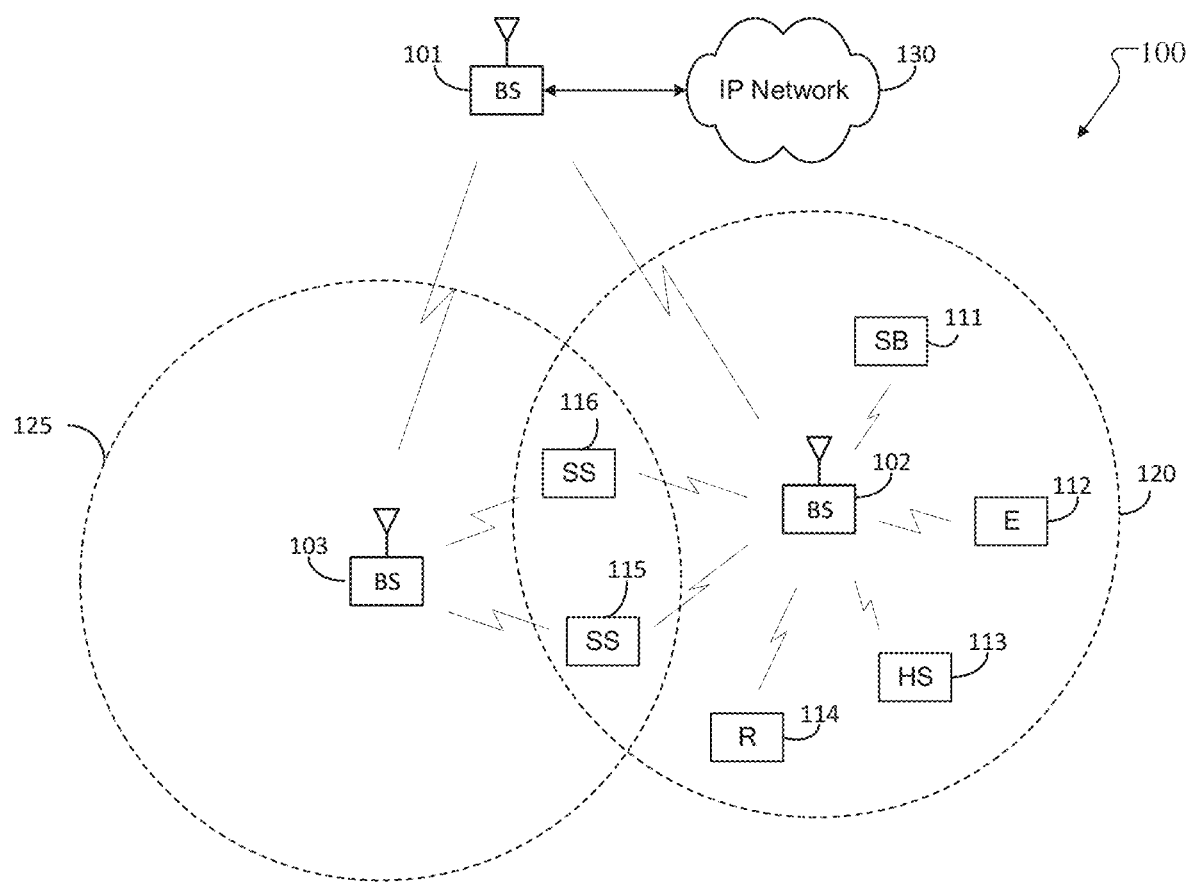
FIG. 1 illustrates an exemplary wireless network according to various embodiments of this disclosure.

The figures included herein, and the various embodiments used to describe the principles of the present disclosure are by way of illustration only and should not be construed in any way to limit the scope of the disclosure. Those skilled in the art will understand that the principles of the present disclosure may be implemented in any suitably arranged wireless communication system.

Novel aspects of the various embodiments disclosed herein provide for phased array antennas with 2-dimensional beam steering capability in azimuth and elevation angles. For a given beam width or directivity, the number of antennas in a M×N array is reduced from the conventional number of M*N to a reduced number equal to 2*N or 2*M. The benefit of "low complexity" is realized particularly when the number of elements in the array aperture grows large. Then the conventional array with M*N elements consumes significantly more resources than the low complexity array with 2N radio blocks.

At high frequencies in the cm- and mm-wave regime where particularly large numbers of antenna elements are required, this scaling advantage may lead to an order of magnitude lower number of radio front end components, saving associated cost, power consumption, and assembly size. The embodiments disclosed herein are particularly useful in applications where a large steering range is required in one dimension (usually azimuth) and only a small steering range is necessary in the orthogonal dimension (usually elevation), which is typical in wireless infrastructure radios. For example, in wireless infrastructure radios, beam steering range is asymmetric, i.e. wide in azimuth direction (e.g. +/−60 degrees) and narrow in elevation direction (e.g. +/−10 degrees). The methods disclosed here naturally fit with this use case while providing the full hardware efficiency gain.

Not only are the novel aspects of this disclosure applicable to all the cited beam steering methods (e.g., all analog, hybrid analog-digital, or full digital architectures), the novel aspects are also applicable to RF sensing use cases. For example in RF (automotive-) radar, the azimuth scanning range is also much wider than the elevation scanning range. A high degree of angular resolutions requires large apertures that can be cost-prohibitive when classic array implementations are considered.

A transceiver with a combined aperture formed from a plurality of sub-apertures provides implementation efficiency, i.e. to lower the number of signal processing paths required for a particular aperture gain. When a sub-aperture is constructed from a larger number of elements, the arrangement is such that the native, in-built, fixed beam steering angle is obtained. This will typically be done by a combination of element placement and inter-element connectivity. Any suitable implementation for the elements and the connectivity in between them may be chosen. Elements may be antennas in electromagnetic apertures or acoustic transducers in sonic apertures. Sub-apertures may also be single, large antennas such as a horn antennas, parabolic reflectors, or the like. In this case, the native steering angle may be obtained by mechanical orientation of the aperture.

FIG. 1 illustrates an exemplary wireless network according to various embodiments of this disclosure. The embodiment of the wireless network 100 shown in FIG. 1 is for illustration only and other embodiments of the wireless network 100 could be used without departing from the scope of this disclosure.

The wireless network 100 includes a base station (BS) 101, a BS 102, and a BS 103. The BS 101 communicates with the BS 102 and the BS 103. The BS 101 also communicates with at least one Internet Protocol (IP) network 130, such as the Internet, a proprietary IP network, or other data network.

Depending on the network type, the term "base station" or "BS" can refer to any component (or collection of components) configured to provide wireless access to a network, such as transmit point (TP), transmit-receive point (TRP), an enhanced base station (eNodeB or eNB or gNB), a macrocell, a femtocell, a WiFi access point (AP), or other wirelessly enabled devices. Base stations may provide wireless access in accordance with one or more wireless communication protocols, e.g., 5G 3GPP New Radio Interface/Access (NR), long term evolution (LTE), LTE advanced (LTE-A), High Speed Packet Access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to a "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

The BS 102 provides wireless broadband access to the network 130 for a first plurality of user equipments (UEs) within a coverage area 120 of the BS 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and an UE 116, which may be a mobile device (M) like a cell phone, a wireless laptop, a wireless PDA, or the like. The BS 103 provides wireless broadband access to the network 130 for a second plurality of UEs within a coverage area 125 of the BS 103. The second plurality of UEs includes the UE 115 and the UE 116. In some embodiments, one or more of the eNBs 101-103 may communicate with each other and with the UEs 111-116 using 5G, long-term evolution (LTE), LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

As described in more detail below, any one or more electronic devices in system 100, such as one or more of BS 101-103 or one or more UEs 111-116, can have transceivers with a set of composite antenna arrays capable of 2D beam steering in a first direction using conventional methods (e.g., altering signal phases for each antenna element) and in a second direction using the novel, low-complexity steering described in various embodiments of this disclosure. Low-complexity steering, or alternatively steering in the low-complexity direction, is beam steering of a combined beam from a composite antenna array between a first native beam steering angle and a second native beam steering angle, the native beam steering angles determined by the sub-arrays forming the composite antenna array. A native beam steering angle is a fixed direction of transmission of a beam from a sub-array due to arrangement of its antenna elements. Steering is achieved by controlling a relative amplitude and phase of driving signals exciting each of the sub-arrays.

Although FIG. 1 illustrates one example of a wireless network 100, various changes may be made to FIG. 1. For example, the wireless network 100 could include any number of BSs and any number of UEs in any suitable arrangement. Also, the BS 101 could communicate directly with any number of UEs and provide those UEs with wireless broadband access to the network 130. Similarly, each BS 102-103 could communicate directly with the network 130 and provide UEs with direct wireless broadband access to the network 130. Further, the BS 101, 102, and/or 103 could provide access to other or additional external networks, such as external telephone networks or other types of data networks.

Figure 2:
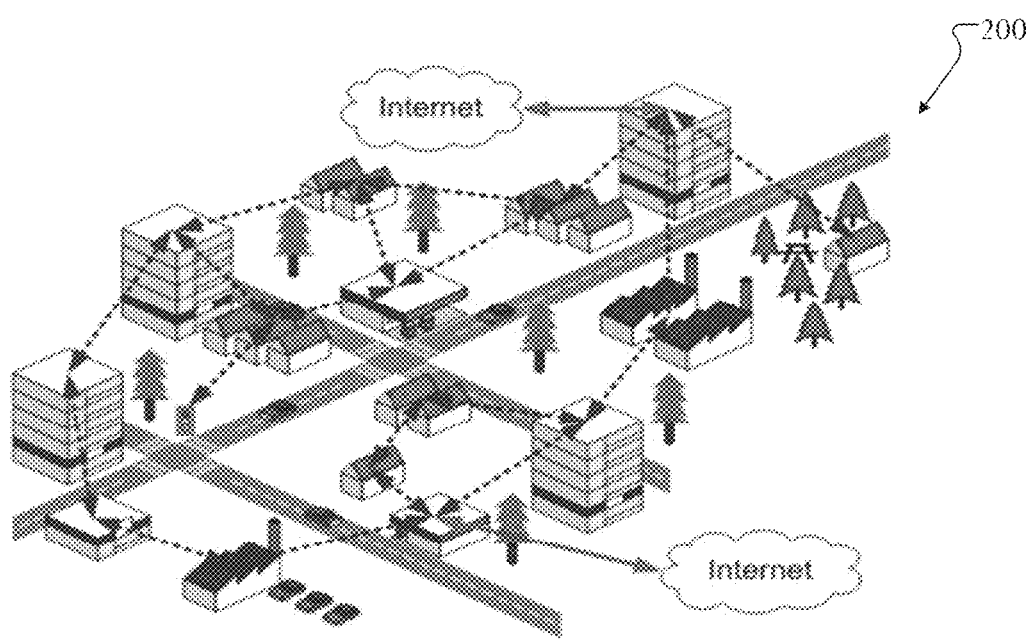
FIG. 2 illustrates an exemplary mesh network according to various embodiments of this disclosure.

FIG. 2 illustrates an exemplary mesh network according to various embodiments of this disclosure. The mesh network 200 is a communications network like communications network 100 in FIG. 1, but is a relatively-short-range infrastructure-grade communications network formed from a plurality of radio installations, i.e., individual network nodes at each building. Each node of the mesh network 200 can "see" at least two other nodes for robust service availability because mm-wave links can be easily blocked by small objects like birds, leaves, etc. Since most of the nodes are close to in-plane, a narrow steering range in vertical (e.g., elevation) direction is sufficient, while steering range in horizontal (e.g., azimuth) direction should be as large as possible in order to minimize the number of sector-radios for 360 deg. coverage. Hence, for this point-to-multipoint use case, in the elevation direction, steering range needs to accommodate the outer envelope of elevation distribution plus mechanical alignment tolerance and wind shake, etc. Conventional methods can be used to provide steering in the larger, azimuth direction, and low-complexity steering can be used to provide steering in the narrower, elevation direction. Two-dimensional steering as disclosed herein is equally applicable in point-to-point communications, e.g. wireless backhaul applications. In this case, the array elements themselves may be highly directive, which leads to low steering range limits in either direction, albeit with different steering control.

While the previous embodiments describe the use of low complexity steering for communications, novel aspects of this disclosure can be applied to other fields. For example, in recent years, the field of RF sensing has seen significant growth, in large part driven by the demand for automotive radar sensors. In the future, RF sensing/radar uses cases can expand into consumer electronics, TVs, home and automation robotics. Furthermore, the disclosed beam steering methods are applicable not only for electromagnetic arrays, but arrays of any sensor modality. Ultrasonic transducer arrays are a common example in consumer, automotive, medical, or other, general, SONAR applications.

Figure 3:
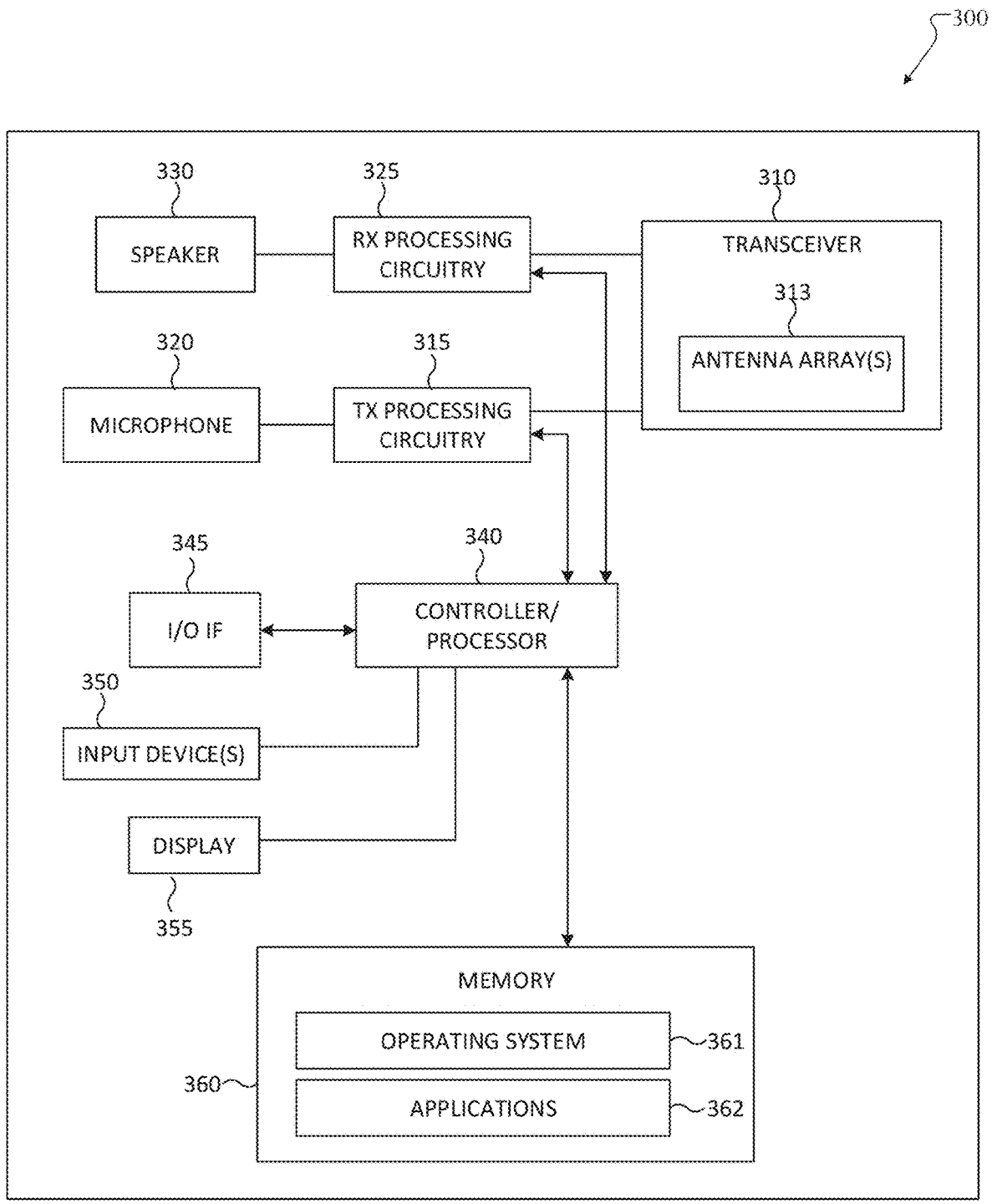
FIG. 3 illustrates an exemplary electronic device capable of low-complexity beam steering according to various embodiments of this disclosure.

FIG. 3 illustrates an electronic device 300 according to one embodiment of this disclosure. The electronic device 300 is for illustration only and should not be deemed limiting. In some embodiments, the electronic device may be a UE, such as UE 116 in FIG. 1, or a BS, such as BS 101 in FIG. 1.

The electronic device 300 includes an antenna 305, a transceiver 310, transmit (TX) processing circuitry 315, a microphone 320, and receive (RX) processing circuitry 325. The electronic device 300 also includes a speaker 330, a main processor 340, an input/output (I/O) interface (IF) 345, a keypad 350, a display 355, and a memory 360. The memory 360 includes a basic operating system (OS) program 361 and one or more applications 362.

The transceiver 310 can include one or more transceivers that include an antenna array 313. The antenna array 313 can be a composite array formed from a pair of sub-arrays, each of which has a sub-aperture with an associated native beam steering angle. A combined beam can be steered in a low-complexity direction between the two native beam steering angles, as described in more detail in the figures that follow.

The transceiver 310 receives an incoming RF signal transmitted by a base station of the network 100. In a non-limiting embodiment, the RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna array 313.

The main processor 340 can include one or more processors or other processing devices and execute the basic OS program 361 stored in the memory 360 in order to control the overall operation of the electronic device 300. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360, such as operations for channel quality measurement and reporting for systems having 2D antenna arrays as described in embodiments of this disclosure as described in embodiments of this disclosure. The main processor 340 can move data into or out of the memory 360 as required by an executing process. In some embodiments, the main processor 340 is configured to execute the applications 362 based on the OS program 361 or in response to signals received from eNBs or an operator. The main processor 340 is also coupled to the I/O interface 345, which provides the electronic device 300 with the ability to connect to other devices such as laptop computers and handheld computers. The I/O interface 345 is the communication path between these accessories and the main controller 340.

The main processor 340 is also coupled to the keypad 350 and the display unit 355. The operator of the electronic device 300 can use the keypad 350 to enter data into the electronic device 300. The display 355 may be a liquid crystal display or other display capable of rendering text and/or at least limited graphics, such as from web sites.

The memory 360 is coupled to the main processor 340. Part of the memory 360 could include a random-access memory (RAM), and another part of the memory 360 could include a Flash memory or other read-only memory (ROM). Although FIG. 3 illustrates one example of electronic device 300, various changes may be made to FIG. 3. For example, various components in FIG. 3 could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3 illustrates the electronic device 300 configured as a mobile telephone or smartphone, UEs could be configured to operate as other types of mobile or stationary devices.

Figure 4:
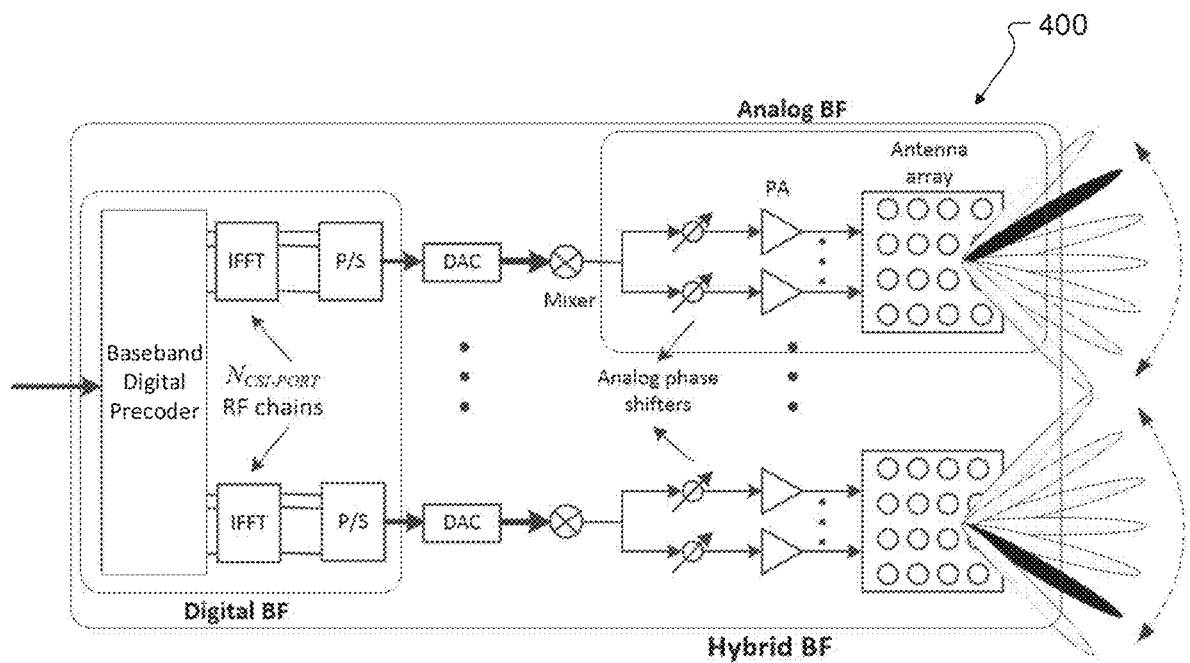
FIG. 4 illustrates an exemplary mm-wave communication system according to various embodiments of this disclosure.

FIG. 4 illustrates an exemplary mm-wave communication system according to embodiments of this disclosure. The communication system 400 can be implemented in an electronic device, such as electronic device 300 in FIG. 3. The embodiment shown in FIG. 4 is for illustration only. Other embodiments are used without departing from the scope of this disclosure.

For mm-Wave bands, the number of antenna elements can be large for a given form factor due to the small wavelengths of the signal. The physical extent of antenna elements generally scales with the wavelength associated with the intended communication frequency band and typically falls in the range between ½ to 1 wavelength in either dimension. As an example, planar antenna elements for use in the common 28 GHz or 60 GHz frequency bands will typically occupy an area of (½ wavelength)-squared, or approximately 5.4×5.4 mm$^2$ (28 GHz) or 2.5×2.5 mm$^2$ (60 GHz). Small arrays of such antennas are compatible with the physical constraints of handheld mobile devices and are used to the enable Gbps-level high-throughput communications at the mm-wave frequencies.

The number of digital chains is limited due to constraints on hardware size, power consumption and implementation cost, which differ between mobile device and base station. In one embodiment, it is advantageous and customary that one digital chain be mapped to a large number of antenna elements which can be controlled by a bank of analog phase shifters. One digital chain then connects to one sub-array which produces a narrow analog beam through analog beamforming. As a general rule, the angular beam-width of a square N-element array, fed by coherent electrical signals, is on the order of $\sqrt{\pi/N}$ [rad]. The center-peak of this analog beam can be pointed to or swept across a wide range of angles by selectively delaying element signals relative to each other, typically by adjusting a bank of phase shifters. For clarity, FIG. 4 only shows the signal path in transmit direction. It is readily understood by those skilled in the art that the signal paths will also include hardware in receive direction (from antennas to digital output via low-noise amplifiers, phase shifters, mixers, analog-to-digital converters, and FFT blocks).

The trend to increasing frequencies for communication systems leads to an increase of antenna aperture areas and therefore a larger number of antenna elements in these apertures. This trend is described in more detail in FIG. 5 that follows.

Figure 5:
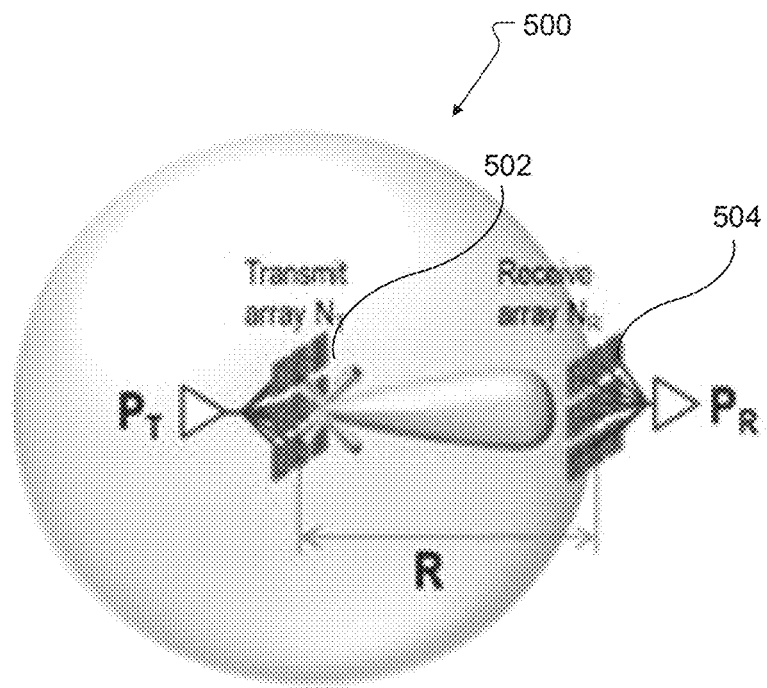
FIG. 5 illustrates basic wireless link budget scaling according to various embodiments of this disclosure.

FIG. 5 illustrates basic wireless link budget scaling in a system according to various embodiments of this disclosure. The system 500 depicts a communication link established over a distance R between a transmit array 502 and a receive array 504 using electromagnetic waves of wavelength λ. A total, combined transmit power PT is distributed across a transmit antenna aperture with area $A_T$. If the radiation from the transmit aperture was isotropic, the power density ($p_d$) at the receiver array 504 would simply be $P_T/(4\pi R^2)$. Due to basic wave diffraction, however, the aperture will focus the transmit power into a "beam" which, if steered towards the receiver aperture, increases the power density ($p_d$) to $P_T A_T/(\lambda^2 R^2)$, neglecting additional losses, efficiencies and other non-idealities. The receiver aperture collects the incoming power across its receive antenna aperture area $A_R$, leading to the basic scaling where the received power (PR) at the receiver array 504 is:

$$P_R = p_d A_R \sim P_T \frac{A_T A_R}{R^2 \lambda^2} \propto N_T N_R \frac{\lambda^2}{R^2}$$

Since the linear dimensions of individual antenna elements are typically on the order of λ/2, the aperture area of a single element scales in proportion to $\lambda^2$ and a (potentially large) number of elements $N_T$, $N_R$ are required to create overall antenna aperture areas $A_T$, $A_R$.

In a network of symmetric nodes ($A_T = A_R$) and the number of required antenna elements per aperture scales linearly with the communication frequency (i.e., inversely with the wavelength). Hence, a communication link at 10 GHz (100 GHz) will require 10× (100×) the number of antenna elements of a link at 1 GHz, where 1 element is typically sufficient. Since beam steering is assumed, 10× (100×) the amount of radio hardware is required, which directly leads to the need for a low-cost, low-complexity implementation for steerable antenna arrays.

An understanding of radiation patterns from antenna apertures, as discussed in FIGS. 6-9, will form the basis of the low-complexity steering approach according to various embodiments of this disclosure.

Figure 6:
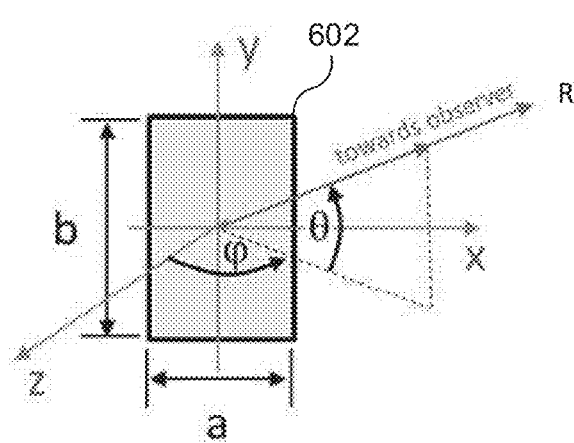
FIG. 6 illustrates a continuous aperture according to various embodiments of this disclosure.

FIG. 6 illustrates a continuous aperture according to various embodiments of this disclosure. An aperture 602 has dimensions a×b and is centered at the origin of an x-y coordinate system. An observer at a far distance R from the origin, where R is much larger than any dimension of the aperture, such that $(X_{obs}, Y_{obs}) \sim R \cdot (\sin \varphi, \sin \theta)$, where (φ, θ) are the observation angles in azimuth and elevation directions. The aperture is illuminated uniformly with an aerial field density $E_A$ [(V/m)/m²]. Similar to conventional array analysis, the uniform-illumination assumption is used for convenience. In order to create beams in directions other than normal to the aperture (x, y)-plane, phase progressions are introduced towards steering angles (φ$_S$, θ$_S$), while keeping the phase in the center of the aperture at zero (as the reference):

$E_A(x,y) = E_A \cdot e^{-ik_0 x \sin \varphi_S} \cdot e^{-ik_0 y \sin \theta_S}$, where $K_0 = 2\pi/\lambda_0$.

At the observer location at the far distance R, the incremental field from a source location (x, y) on the aperture is:

$$dE = \frac{E_A(x, y) dx dy}{R} \cdot e^{ik_0 x \sin \varphi} \cdot e^{ik_0 y \sin \theta}.$$

The total field at the observer location is thus:

$$E = \int\int_{aperture} dE = \frac{E_A}{R} \cdot \int_{-a/2}^{a/2} dx e^{ik_0 x (\sin \varphi - \sin \varphi_S)} \cdot \int_{-b/2}^{b/2} dy e^{ik_0 y (\sin \theta - \sin \theta_S)} =$$

$$\frac{E_A \cdot ab}{R} \cdot \text{sinc}(\Psi - \Psi_S) \cdot \text{sinc}(\Omega - \Omega_S),$$

with the abbreviations $\begin{cases} \Psi_{(S)} = \frac{k_0 a}{2} \cdot \sin \varphi_{(S)} \\ \Omega_{(S)} = \frac{k_0 b}{2} \cdot \sin \theta_{(S)} \end{cases}$.

The field amplitude follows the sinc( )-function shape in both azimuth and elevation directions with the width of the sinc( ) pulses becoming narrower as the dimensions of the array increase, relative to the wavelength used ($k_0 a$, $k_0 b$).

What is conventionally referred to as the "beam pattern" is the power flux, i.e. the real part of the Poynting vector: Re(S)=Re(E×H*). In the far-field, plane waves E and H are mutually orthogonal and S points in the direction of propagation (φ, θ). In free space, the magnetic field H is connected to the electric field E via the free-space impedance $\eta_0 = 377\Omega$: H=k×E/$\eta_0$. When E is sinusoidal with amplitude E, the time-averaged power flux is then |Re(S)|=(EE*)/2$\eta_0$. Hence, the beam (power flux) pattern is of the form:

PATT~$\text{sinc}^2(\Psi-\Psi_S) \cdot \text{sinc}^2(\Omega-\Omega_S)$.

Figure 7:
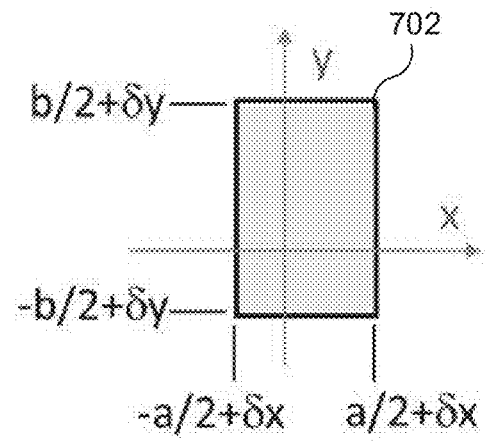
FIG. 7 illustrates a continuous aperture with an offset according to various embodiments of this disclosure.

FIG. 7 illustrates a continuous aperture with an offset according to various embodiments of this disclosure. The aperture 702 is like aperture 602 in FIG. 6, but offset by (δx, δy) from center with the zero-reference phase remaining in the center of the aperture. The phase progressions are now:

$(e^{-ik_0(x-\delta_x) \sin \varphi_S}, e^{-ik_0(y-\delta_y) \sin \theta_S})$ where $K_0 = 2\pi/\lambda_0$.

The incremental field contribution at the observer location is:

$$dE = \frac{E_A dx dy}{R} \cdot (e^{-ik_0(x-\delta_x) \sin \varphi_S} e^{ik_0 x \sin \varphi}) \cdot (e^{-ik_0(y-\delta_y) \sin \theta_S} e^{ik_0 y \sin \theta}).$$

The total field at the observer location is again obtained by collecting contributions across the entire aperture area:

$$E = \int\int_{aperture} dE$$

$$= \frac{E_A}{R} \cdot \int_{-a/2+\delta_x}^{a/2+\delta_x} dx e^{-ik_0(x-\delta_x) \sin \varphi_S} e^{ik_0 x \sin \varphi} \cdot$$

$$\int_{-b/2+\delta_y}^{b/2+\delta_y} dy e^{-ik_0(y-\delta_y) \sin \theta_S} e^{ik_0 y \sin \theta}$$

$$= \frac{E_A(ab)}{R} \cdot e^{i\Psi(2\delta_x/a)} \text{sinc}(\Psi - \Psi_S) \cdot e^{i\Omega(2\delta_y/b)} \text{sinc}(\Omega - \Omega_S),$$

with the substitutions $\begin{cases} k_0 \delta_x \sin \varphi = \frac{2\delta_x}{a} \Psi \\ k_0 \delta_y \sin \theta = \frac{2\delta_y}{b} \Omega \end{cases}$.

A physical shift in the aperture placement (δx, δy) introduces an additional phase in the observed field's phase: $k_0 \delta_x \sin \varphi + k_0 \delta_y \sin \theta$. The power flux pattern remains unchanged.

Figure 8:
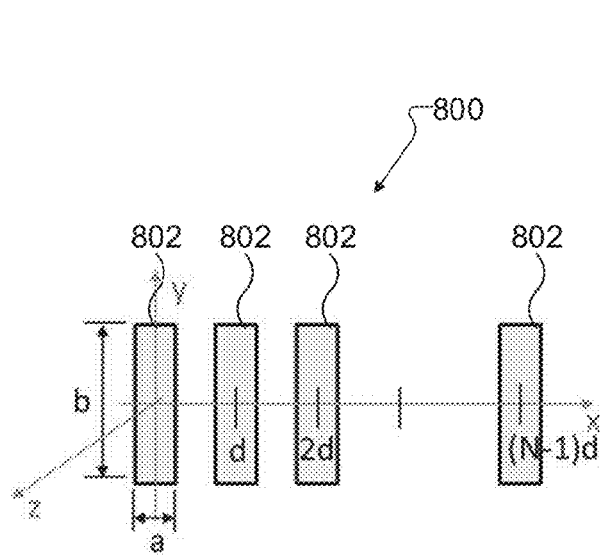
FIG. 8 illustrates a one-dimensional, N-element lattice of two-dimensional, continuous apertures according to various embodiments of this disclosure.

FIG. 8 illustrates a one-dimensional, N-element lattice of two-dimensional, continuous apertures according to various embodiments of this disclosure. The prior beam pattern analysis is extended to array 800, which includes a plurality of two-dimensional apertures 802 that form a larger, combined aperture. Each of the apertures 802 are like apertures 702 in FIG. 7. A non-limiting example of array 800 might use tall and narrow sub-array columns, such as what is obtained from vertical series-fed micro-strip or slot arrays, replicated N-times horizontally with spacing d, where d is on the order of $\lambda/2$. In such an array, beam steering in azimuth direction would be controlled by progressively phasing adjacent columns, whereas elevation steering would be designed into the phase progression between elements in the sub-array columns.

As before, an observer is at a far distance R, where R is much larger than any dimension of the combined aperture, such that $(X_{obs}, Y_{obs}) \sim R^*(\sin \varphi, \sin \theta)$, where $(\varphi, \theta)$ are the observation angles in azimuth and elevation directions. The aperture is illuminated uniformly as before with horizontal, vertical phase progressions across the entire lattice, such that the beam points towards azimuth, elevation angles $(\varphi_S, \theta_S)$:

$$E_A(x,y) = E_A \cdot e^{-ik_0 x \sin \varphi_S} \cdot e^{-ik_0 y \sin \theta_S}.$$

The combined field in the observer's direction results from the collecting the combined field across all apertures in the lattice:

$$E = \frac{E_A}{R} \sum_{n=0}^{N-1} \int_{nd-a/2}^{nd+a/2} dx e^{ik_0 x(\sin \phi - \sin \phi_S)} \cdot$$

$$\int_{-b/2}^{b/2} dy e^{ik_0 y(\sin \theta - \sin \theta_S)}$$

$$= \frac{E_A(Nab)}{R} \cdot \left[ \mathrm{sinc}(\Psi - \Psi_S) \cdot \frac{\sin(N(\Delta - \Delta_S))}{N \sin(\Delta - \Delta_S)} \cdot e^{i(N-1)(\Delta - \Delta_S)} \right] \cdot$$

$$\mathrm{sinc}(\Omega - \Omega_S),$$

with the abbreviations
$$\begin{cases} \Psi_{(S)} = \frac{k_0 a}{2} \cdot \sin \phi_{(S)} = \frac{a}{d} \Delta_{(S)} \\ \Omega_{(S)} = \frac{k_0 b}{2} \cdot \sin \theta_{(S)} \\ \Delta_{(S)} = \frac{k_0 d}{2} \cdot \sin \phi_{(S)} \end{cases}.$$

The term in brackets, $$\left[ \mathrm{sinc}(\Psi - \Psi_S) \cdot \frac{\sin(N(\Delta - \Delta_S))}{N \sin(\Delta - \Delta_S)} \cdot e^{i(N-1)(\Delta - \Delta_S)} \right],$$

can be seen as the product of an "element factor" EF~sinc $(\psi - \psi_S)$ and an "array factor"

$$AF \sim \frac{\sin(N(\Delta - \Delta_S))}{N \sin(\Delta - \Delta_S)},$$

which is known to those skilled in the relevant art. For large N>>1, the combined beam pattern will show a main peak and side-lobes, the width of which are set by the overall width of the lattice Nd with very little impact from the sinc( )-beam shape of the individual elements. The effect of the elements-apertures is multiplicative, i.e. the magnitudes of the lattice's side lobes are scaled by the element pattern. Close to the peak in the steered direction AF→1, i.e. the combined field is N-times larger than from a single aperture, as expected from coherent addition.

Considering an offset $(\delta x, \delta y)$ in the position of the lattice as a whole, the field of each individual element aperture exhibits the same additional phase $k_0 \delta_x \sin \phi + k_0 \delta_y \sin \theta$ as before, which thereby is also the additional phase from the combined array.

In actual arrays the elements are not steered. This can be addressed in the above equation by replacing $\mathrm{sinc}(\psi - \psi_S) \rightarrow \mathrm{sinc}(\psi)$, assuming the element itself has a pattern peak in normal (broadside) direction.

Figure 9:
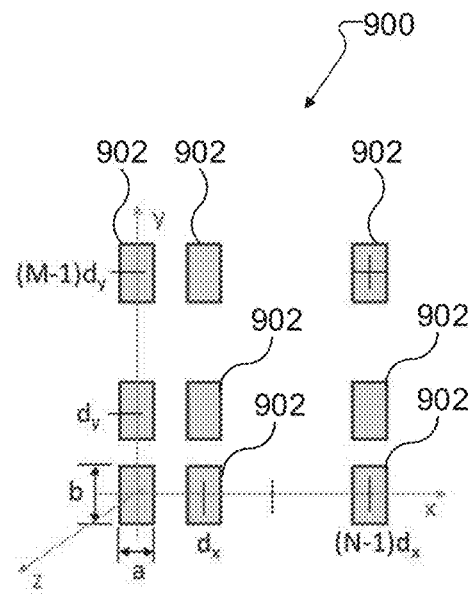
FIG. 9 illustrates a two-dimensional, N×M-element lattice of two-dimensional, continuous apertures according to various embodiments of this disclosure.

FIG. 9 illustrates a two-dimensional, N×M-element lattice of two-dimensional, continuous apertures according to various embodiments of this disclosure. The array 900 has the field representation of a conventional, regularly spaced, uniformly illuminated antenna array that is used conventionally in beam steering phased arrays. Assumptions are the same as before but the beam pattern analysis now takes into consideration a number M of vertically stacked 1D horizontal lattices with antenna elements 902 separated by spacings $d_X$ and $d_Y$.

Since the field integrations across the elements and the horizontal & vertical summations remain separable, the combined field from the array will be the product of $(EF_x * AF_x)*(EF_y * AF_y)$ in analogy with the earlier 1D result:

$$E = \frac{E_A}{R} \sum_{n=1}^{N-1} \int_{nd_x - a/2}^{nd_x + a/2} dx e^{ik_0 x(\sin \phi - \sin \phi_S)} \cdot \sum_{m=0}^{M-1} \int_{md_y - b/2}^{md_y + b/2} dy e^{ik_0 y(\sin \theta - \sin \theta_S)}$$

$$= \frac{E_A(MNab)}{R} \cdot \left[ \mathrm{sinc}(\Psi - \Psi_S) \cdot \frac{\sin(N(\Delta - \Delta_S))}{N \sin(\Delta - \Delta_S)} \cdot e^{i(N-1)(\Delta - \Delta_S)} \right] \cdot$$

$$\left[ \mathrm{sinc}(\Omega - \Omega_S) \cdot \frac{\sin(M(\Phi - \Phi_S))}{M \sin(\Phi - \Phi_S)} \cdot e^{i(M-1)(\Phi - \Phi_S)} \right],$$

with the abbreviations:

$$\begin{cases} \Delta_{(S)} = \frac{k_0 d_x}{2} \cdot \sin \phi_{(S)} & \Psi_{(S)} = \frac{k_0 a}{2} \cdot \sin \phi_{(S)} = \frac{a}{d_x} \Delta_{(S)} \\ \Phi_{(S)} = \frac{k_0 d_y}{2} \cdot \sin \theta_{(S)} & \Omega_{(S)} = \frac{k_0 b}{2} \cdot \sin \theta_{(S)} = \frac{b}{d_y} \Phi_{(S)} \end{cases}.$$

As before, an array origin offset $(\delta x, \delta y)$ causes an additional phase $k_0 \delta_x \sin \phi + k_0 \delta_y \sin \theta$ in the field of each individual element and thereby for the whole aperture. Non-steered elements use $EF_x \sim \mathrm{sinc}(\psi)$ and $EF_y \sim \mathrm{sinc}(\Omega)$.

Figure 10:
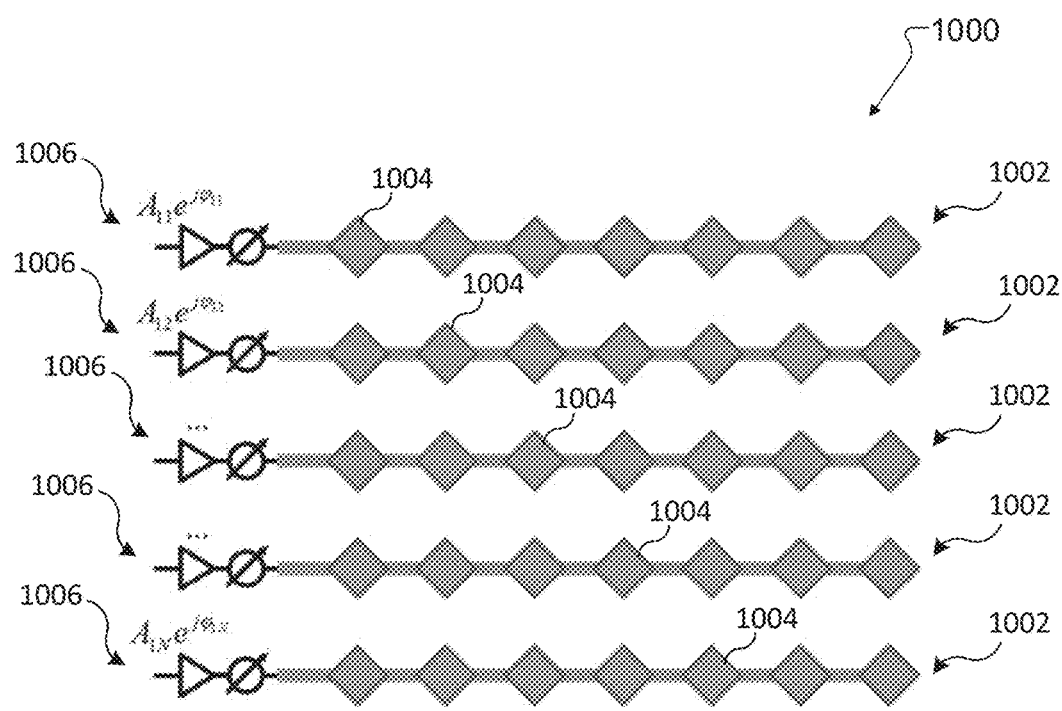
FIG. 10 illustrates an N×M array of antenna elements of a transceiver according to various embodiments of this disclosure.

FIG. 10 illustrates an N×M array of antenna elements of a transceiver according to various embodiments of this disclosure. The array 1000 can be one of a plurality of antenna arrays in an electronic device, such as antenna array 313 in FIG. 3. Generally, the array 1000 has N strings, each of which has M antenna elements, with N and M being non-zero integers. In the depicted embodiment, the array 1000 has five strings 1002, each of which has seven antenna elements 1004.

Each string 1002 is connected at one end to a signal processing path 1006, which can also be referred to in the alternative as "coefficient weights" having an amplitude and phase represented generally by $A_{ik} e^{j \varphi_{ik}}$. Values for the coefficient weights can be selected so that a particular beam pattern shape and/or steering angle is obtained.

The array 1001 has a planar, sub-aperture design that is suitable for large steering range in one direction orthogonal to the strings 1002 (i.e., in the vertical direction for the array 1000 depicted in in FIG. 1000) and narrow steering range in the a direction parallel to the strings 1002 (i.e., in the horizontal direction for the array 1000 when paired with another array having an equal but opposite native beam steering angle). This narrow steering range may also be referred to herein as the "low complexity" direction. When the array 1001 is paired with another array to enable low-complexity steering, each of the constituent arrays may be referred to in the alternative as a sub-array. The combination of the two sub-arrays forms a composite array, as discussed in the figure that follows.

Figure 11:
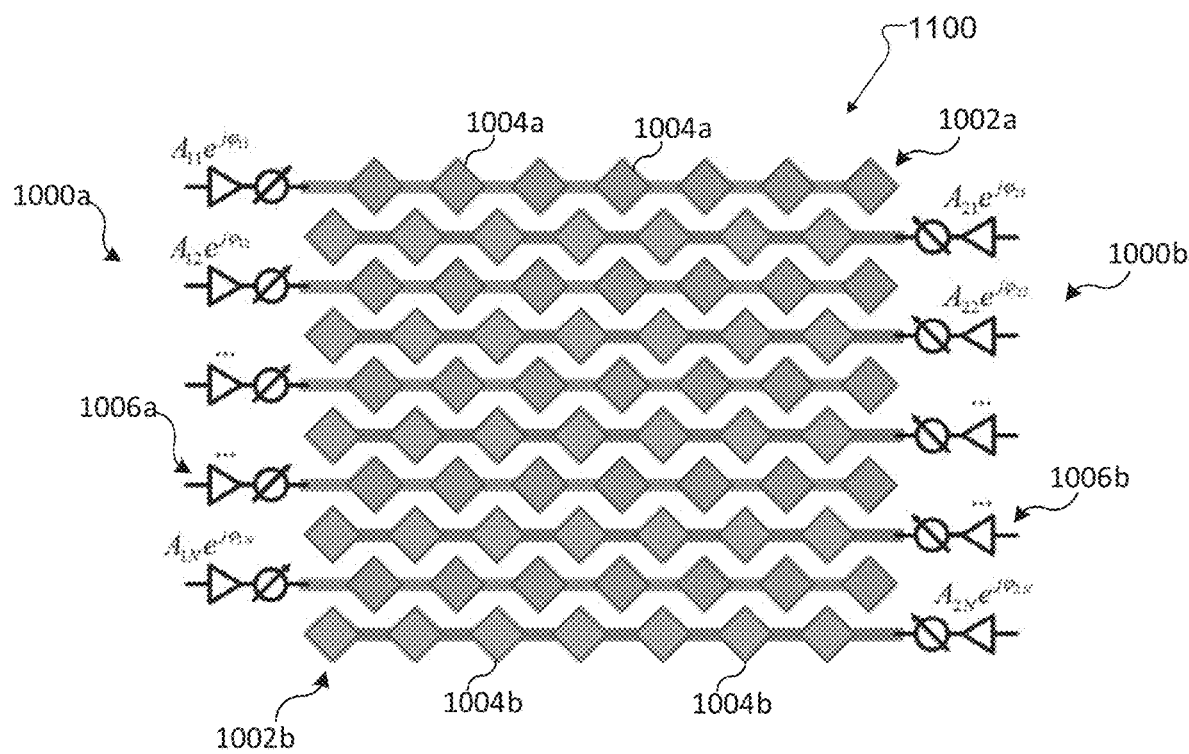
FIG. 11 illustrates a composite, edge-fed 2N×M array formed from a first antenna array and a second antenna array according to various embodiments of this disclosure.

FIG. 11 illustrates a composite, edge-fed 2N×M array formed from a first antenna array and a second antenna array according to various embodiments of this disclosure. The composite array 1100 is formed by interleaving the strings of a first antenna array with a second antenna array so that a second sub-aperture is placed in close physical proximity with a first sub-aperture such that the communication channel effects (i.e., propagation, attenuation, reflections) are effectively equal between the first sub-aperture and an observation point in the far-field and the second sub-aperture and the same observation point. This second sub-aperture will have a different native, beam steering angle. In a non-limiting embodiment, the native beam steering angle for the second antenna array is equal but opposite to the native beam steering angle for the first antenna array. As used herein, the native beam steering angle may also be referred to in the alternative as a native beam tilt.

In the depicted embodiment, the composite array 1100 is generally a 2N×M array formed from a first antenna array 1000a having a plurality of strings 1002a interleaved with a plurality of strings 1002b from a second antenna array 1000b. Each of the plurality of strings 1002a and 1002b are formed from a plurality of antenna elements 1004a and 1004b, respectively. Additionally, each of the plurality of strings 1002a of the first array 1000a is edge-fed by a first signal processing path 1006a and each of the plurality of strings 1002b of the second array 1000b is edge-fed by a second signal processing path 1006b that is independently controllable from the first signal processing path 1006a.

Steering range is large in a direction orthogonal to the strings (i.e., in the vertical direction for the composite array 1100) and narrow in a direction parallel to the strings (i.e., in the horizontal direction for the composite array 1100, also referred to as the "low complexity" direction).

Beam patterns of each the two apertures overlap slightly such that an effective beam pattern can be formed via a combination (weighted sum or weighted difference) of the individual beam patterns. Since aperture gain is largest in the direction normal to the aperture plane (broadside direction), a convenient implementation method will use a small, off-broadside, native steering angle in the first sub-aperture. The second sub-aperture may be a mirrored copy of the first sub-aperture, which will have the same small, off-broadside, native steering angle, but in the opposite direction. However, in another embodiment, the mean steering angle of the two native beam steering angles may be off-broadside (i.e., a direction that is not normal to the combined aperture of composite array 1100).

FIG. 12 illustrates a composite, center-fed 2N×M array formed from a first antenna array and a second antenna array according to various embodiments of this disclosure. The composite array 1200 is formed by interleaving the strings of a first antenna array with strings of a second antenna array, like composite array 1100 of FIG. 11. However, each of the strings in composite array 1200 is center-fed to capture the advantages in aperture taper efficiency. Since the entire string needs to form a fixed beam tilt (i.e. a fixed phase progression along the entire string) and the signal travels in opposing directions away from the feed point, the phase delay between the elements should be adjusted, respectively. In the illustrative embodiment in FIG. 12, different physical element spacings on either side of the feed location creates the correct phasing for a single, tilted beam. In the composite array 1200, physical distances $d_1$ between antenna elements on a string are closer together on one side of the feed point and distances $d_2$ are further apart on the other side of the feed point. While the feed point for each of the strings in the composite array 1200 divides each string into portions having equal number of antenna elements on each side, in another embodiment, the feed point can be anywhere along the length of the string except at the end. In another embodiment, an adjustment can be made to the phase delay in the connection between equidistant elements for more or less delay on either side of the feed point. In addition, physical distances may be kept constant while equivalently the electrical distances may be adjusted, for example by varying transmission path lengths between the elements.

FIGS. 13A and 13B illustrate single-element, large aperture antennas and the corresponding far field beams according to various embodiments of this disclosure. The antenna array 1300 can be implemented in an electronic device, such as electronic device 300 in FIG. 3 for low-complexity steering between native beam steering angles.

The antenna array 1300 is formed from a first antenna element 1302a and a second antenna element 1302b, each controlled by separate signal processing paths. The first antenna element 1302a has a sub-aperture with a first native beam steering angle 1350a and a second antenna element 1302b has a sub-aperture with a second native beam steering angle 1350b that differs from the first native beam steering angle 1350a. The two elements are oriented/designed such that their individual beam patterns 1352a and 1352b point in different native steering directions that are chosen so that the beam patterns 1352a and 1352b overlap slightly. As an example, the first native beam steering angle 1350a can be $(\varphi_S, \varphi_S)$ and the second native beam steering angle 1350b can be $(\varphi_S, -\varphi_S)$. A joint beam can be formed by a linear combination of the two beams by appropriate amplitude/phase weighting. In this way, the combined beam can be steered over the union-area of the two individual beam spots as shown in FIG. 13b.

Figures 14A, 14B:
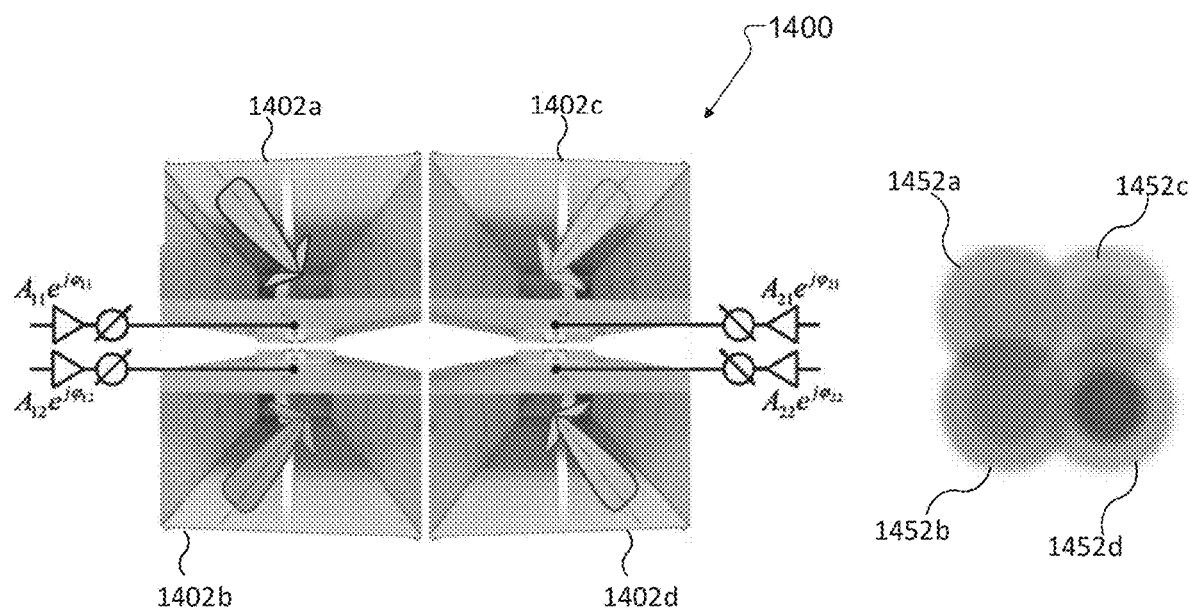
FIGS. 14A and 14B illustrate another single-element, large aperture antennas and the corresponding far field beams according to various embodiments of this disclosure.

FIGS. 14A and 14B illustrate single-element, large aperture antennas and the corresponding far field beams according to various embodiments of this disclosure. The antenna array 1400 can be implemented in an electronic device, such as electronic device 300 in FIG. 3 for low-complexity steering between native beam steering angles.

The antenna array 1400 has four sub-apertures, each controlled by a separate signal processing path. Each of the sub-apertures has a native beam steering angle pointing in different directions but chosen so that the resulting beam patterns slightly overlap. For example, a first antenna element 1402a can have a sub-aperture with a native beam steering angle of $(-\varphi_S, \theta_S)$, a second antenna element 1402b can have a sub-aperture with a native beam steering angle of $(-\varphi_S, -\theta_S)$, a third antenna element 1402c can have a sub-aperture with a native beam steering angle of $(\varphi_S, \theta_S)$, and a fourth antenna element 1402d can have a native beam steering angle of $(\varphi_S, -\theta_S)$. A joint beam can be 2D-steered between the native beam steering angles by a linear combination of the four beams by appropriate amplitude/phase weighting. In this way, the combined beam can be steered over the union-area of the 4 individual beam spots. For example, to generate a beam in the center of the 4 individual beams, all four amplitude/phase coefficients will be equal. The analysis in the latter part of the disclosure equally applies, albeit here in both directions.

Figure 15:
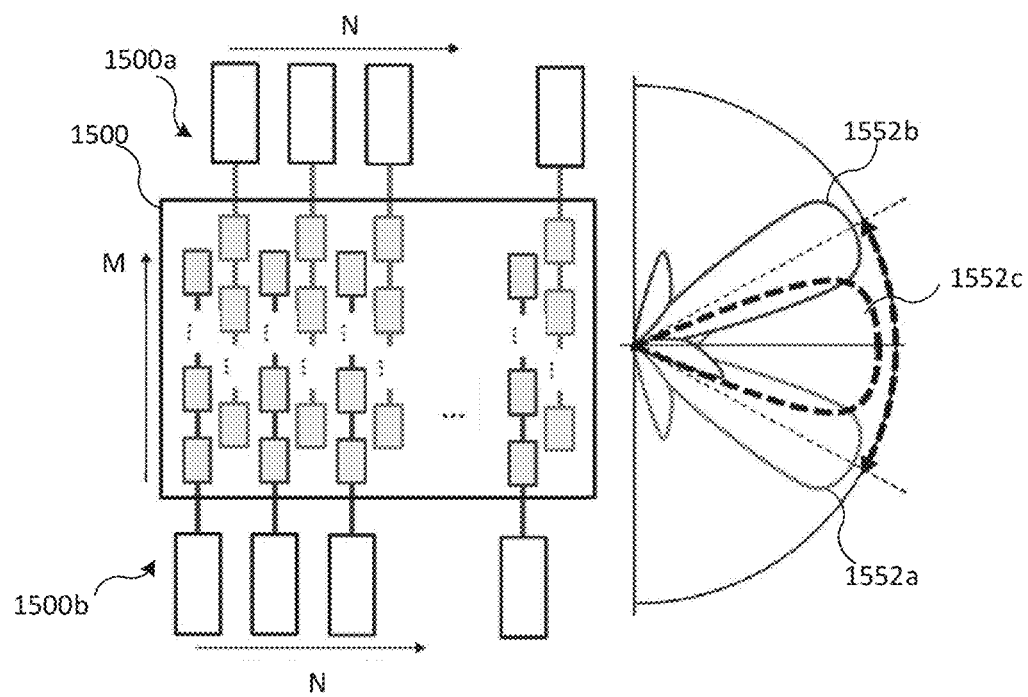
FIG. 15 illustrates beam patterns for a composite 2N×M array according to various embodiments of this disclosure.

FIG. 15 illustrates exemplary beam patterns for a composite 2N×M array according to various embodiments of this disclosure. The composite array 1500 can be implemented in a transceiver of an electronic device, such as antenna array 313 in transceiver 310 of electronic device 300 in FIG. 3.

The composite array 1500 is formed from two antenna arrays interleaved with each other via in-plane offsets such that the individual antenna elements do not mechanically interfere with each other. The individual sub-arrays' beam patterns have wide steering range in one direction (e.g., in azimuth for the depicted configuration) and fixed steering angles (e.g., in elevation) in equal but opposite directions relative to a mean steering angle. In this non-limiting embodiment, the mean steering angle of the combined aperture of composite array 1500 is normal to the plane common to all of the antenna elements (e.g., broadside).

When the first array 1500a is excited, the first beam pattern 1552a is obtained. Similarly, when the second array 1500b is excited, the second beam 1552b is obtained. Symmetry around the mean broadside direction can be obtained by one sub-array being the vertically mirrored version of the other. When both arrays 1500a and 1500b are excited equally and the additional effects of offsets are accounted for, a combined beam 1552c emerges with a peak falling on the mean direction of the first beam 1552a and the second beam 1552b. It will be possible to steer the combined beam continuously between the limits of the first beam 1552a and the second beam 1552b by controlling the relative excitations of the respective sub-arrays in transmit mode, or the relative summation weights of the sub-arrays in receive mode.

If the angular separation between the first beam 1552a and the second beam 1552b are on the order of their respective beam widths, a peak in the combined beam 1552c appears when both are equally excited. If the angular separation is much larger, the first beam 1552a and the second beam 1552b will enhance each other in the combined pattern but will create a "dip" in between two peaks rather than a peak. If the separation is much less than the individual beam widths, the total steering range is less than optimum.

In an exemplary phased array system, the sub-arrays 1500a and 1500b can be formed from a number of series-fed columns of antenna elements, such as series-fed strings of microstrip patch antennas. The spacing between the columns will be such that the required (azimuth) steering range can be obtained without the occurrence of parasitic grating lobes in the beam pattern. Sub-array offsets in the horizontal or vertical directions can established such that the antenna elements avoid mechanical interference and minimize electrical coupling, which can lead to polygonal shaped elements such as diamonds, hexagons, octagons, circular, or elliptical shapes.

Figure 16:
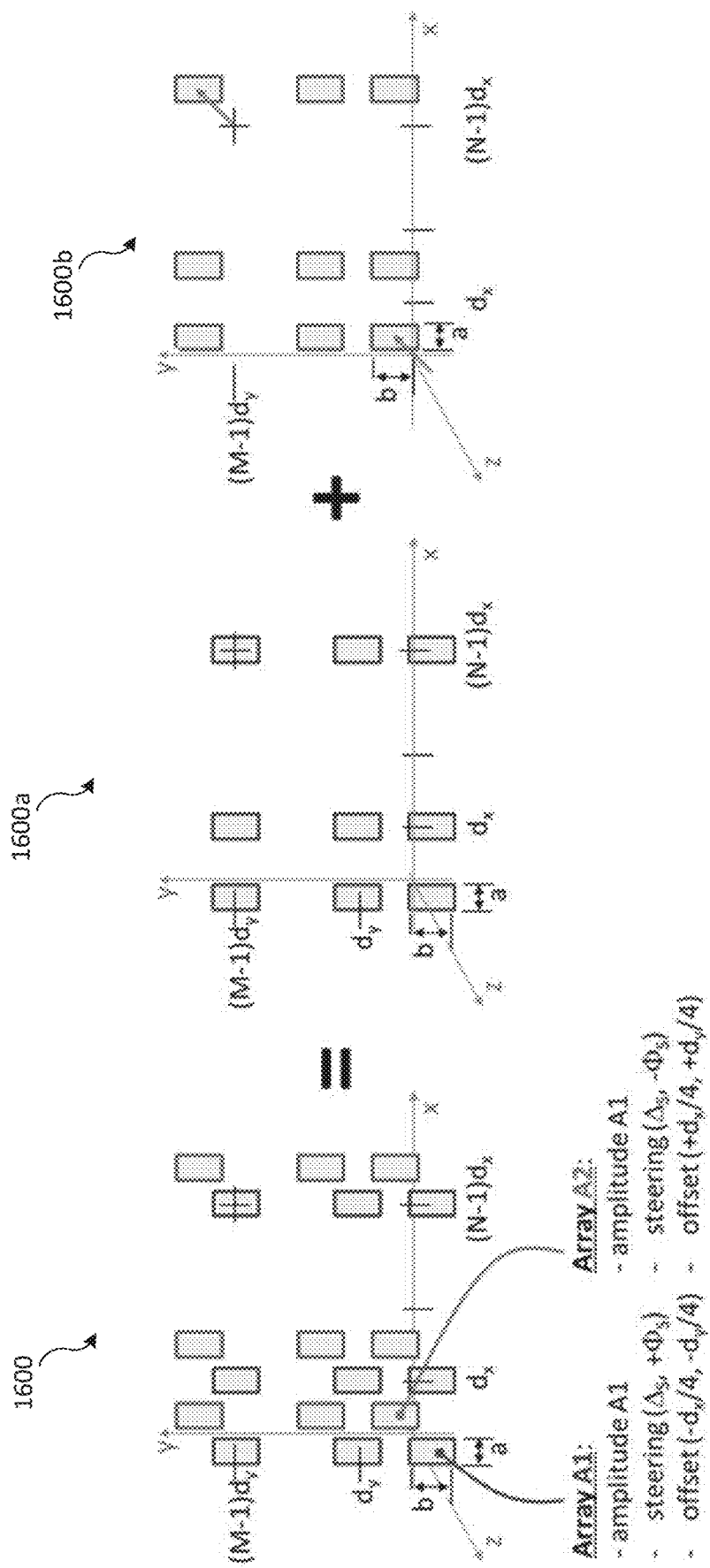
FIG. 16 illustrates a composite 2N×M array as a combination of two offset N×M arrays according to various embodiments of this disclosure.

In a non-limiting embodiment, interleaved sub-arrays can have an offset that is one-half of the individual arrays' column spacing or element spacing, as described in more detail in FIG. 16. However, this offset can be larger. Physically offsetting an aperture in the array plane introduces an observation angle dependent phase shift relative to a non-offset aperture. This phase shift is compensated for in the driving signals to the offset aperture. The compensation value(s) will be chosen to be optimum in the direction of the combined beam peak. In all other directions, the compensation value will be sub-optimal and may cause undesired changes to the combined sidelobe pattern. It can be said that these changes are proportionally smaller, the less offset between the two apertures is used. Therefore, the one-half offset is at least one preferred offset. Larger offsets are possible, up to and even beyond the entire width/length of the individual arrays if the resulting changes to the sidelobe levels are tolerable.

Conventionally, all elements in the sub-arrays participate in the generation of the combined beam(s). However, a portion of the composite array may be shut-off, in cases where the required array gain, transmitted power, combined received power, etc. is less than what is obtained from the full array. This leads to power savings, for example. Further, when only a portion of the composite array is used to establish a beam set "A", the otherwise shut-off remainder of the array may be used to establish a beam set "B" instead. This may be useful to increase communications capacity as more beams are available this way (albeit with lower max. distance due to decreased aperture sizes, i.e. less antenna gain, wider beam widths).

FIG. 16 illustrates an offset for a composite 2N×M array according to various embodiments of this disclosure. The composite array 1600 is an interleaved 2D lattice created from two individual M×N lattices which are offset from each other by one-half the spacing between their elements, i.e. ($\delta x$, $\delta y$)=($d_X/2$, $d_y/2$). Restated, the composite array 1600 is formed from a first array 1600a interleaved with a second array 1600b. The first array 1600a has N strings, each having M antenna elements. Adjacent antenna elements on a same string of the first array 1600a are separated by a first distance (dy) and adjacent antenna elements on adjacent strings of the first array 1600a are separated by a second distance (dx). Antenna elements of the first array 1600a is offset from antenna elements of the second array 1600b by an offset that is one-half the first distance (dx/2), one-half the second distance (dy/2), or both.

For symmetry in the notation, the origin in the joint coordinate system is chosen such that the first array 1600a is shifted by ($-d_X/4$, $-d_y/4$) and the second array 1600b is shifted by ($+d_X/4$, $+d_y/4$). Other shifts can be used instead and will lead to slightly different numerical results, but the functionality remains the same. Offsets by one-half element spacing are favorable in terms of element-to-element coupling.

The steering phases are such that the first array 1600a and the second array 1600b have the same steering phase progression in azimuth (i.e. x-, φ-) direction and equal but opposite steering phase progressions in elevation (i.e. y-, θ-) direction. Therefore, the second array 1600b can be obtained from the first array 1600a by a simple vertical flip and shift by ($d_X/2$, $d_y/2$). Further, to minimize edge effects, "dummy-columns" may be introduced to the sub-array forming the left-most edge of the composite array 1600 and to the sub-array forming the right-most edge of the composite array 1600. No other modifications should be necessary.

Using the prior result for the field pattern of a single array and after inclusion of the additional phase shifts due to the ($\pm d_X/4$, $+d_y/4$) offsets: $e^{\pm i(\Delta+\Phi)/2}$, we obtain:

$$E_{A1} = A_1 \cdot \left[ \frac{\sin(N(\Delta - \Delta_S))}{N \sin(\Delta - \Delta_S)} \cdot e^{i(N-1)(\Delta - \Delta_S)} \right] \cdot$$

$$\left[ \frac{\sin(M(\Phi - \Phi_S))}{M \sin(\Phi - \Phi_S)} \cdot e^{i(M-1)(\Phi - \Phi_S)} \right] \cdot e^{-i(\Delta + \Phi)/2},$$

-continued $$E_{A2} = A_2 \cdot \left[\frac{\sin(N(\Delta - \Delta_S))}{N \sin(\Delta - \Delta_S)} \cdot e^{i(N-1)(\Delta - \Delta_S)}\right].$$

$$\left[\frac{\sin(M(\Phi - \Phi_S))}{M \sin(\Phi - \Phi_S)} \cdot e^{i(M-1)(\Phi - \Phi_S)}\right] \cdot e^{+i(\Delta + \Phi)/2},$$

$$E_{tot} = E_{A1} + E_{A2}.$$

To cancel the offset-related steering effect $\pm(\Delta+\Phi)/2$ at least in the steered direction, amplitudes $A_1$, $A_2$ are defined as the product of (virtual) amplitudes $A_1'$, $A_2'$ with the corresponding cancellation phases:

$$A_1 =: A_1' \cdot e^{i(\Phi_S + \Delta_S)/2}, A_2 =: A_2' \cdot e^{i(\Phi_S - \Delta_S)/2}.$$

To absorb the equal-but-opposite effect from the phase progression across the array width, the driving signal phases are modified to:

$$A_1'' := A_1' \cdot e^{i(M-1)/\Phi_S}, A_2'' := A_2' \cdot e^{+i(M-1)\Phi_S}.$$

With that, the total field becomes:

$$E_{tot} = \left[A_1'' \frac{\sin(M(\Phi - \Phi_S))}{M \sin(\Phi - \Phi_S)} e^{i/2[(\Delta - \Delta_S) + (\Phi - \Phi_S)]} + \right.$$

$$\left. A_1'' \frac{\sin(M(\Phi + \Phi_S))}{M \sin(\Phi + \Phi_S)} e^{+i/2[(\Delta - \Delta_S) + (\Phi + \Phi_S)]}\right] \cdot CF \approx$$

$$[A_1'' \text{sinc}(M(\Phi - \Phi_S)) + A_2'' \text{sinc}(M(\Phi + \Phi_S))] \cdot CF,$$

$$CF = \frac{\sin(N(\Delta - \Delta_S))}{N \sin(\Delta - \Delta_S)} e^{i(N-1)(\Delta - \Delta_S)} e^{i(M-1)\Phi}$$

where CF are factors common to both arrays: and an approximation valid near the pattern peak was made: $e^{i\pm/2[(\Delta-\Delta_S)+(\Phi\pm\Phi_S)]} \approx 1$.

The expression above is the desired form that shows the elevation steerability via relative weighting of $A_1''$, $A_2''$. Once the weights $A_1''$, $A_2''$ are chosen, in actuality, the signals that need to be applied to the column inputs are:

$$A_1 = A_1'' \cdot e^{i(\Phi_S + \Delta_S)/2} \cdot e^{i(M-1)/\Phi_S},$$

$$A_2 = A_2'' \cdot e^{i(\Phi_S + \Delta_S)/2} \cdot e^{i(M-1)/\Phi_S}.$$

The approximate elevation beam pattern, close to the pattern peak, is then simply:

$$\left(\frac{EE^*}{2\eta_0}\right) \propto [A_1'' \text{sinc}(M(\Phi - \Phi_S)) + A_2'' \text{sinc}(M(\Phi + \Phi_S))]^2.$$

Without proof, it is noted that this approximated result is identical to what can be obtained directly from two continuous apertures of (width, height)=$(Nd_X, Md_Y)$, shifted by $(d_X, d_Y)/2$ relative to each other, as discussed earlier. In other words, the above result neglects the discrete nature of the individual elements in the combined pattern, which is of no significant concern in the far field of the array(s).

Half-Power Beam Width

According to the above analysis, the weighting factors $A_1''$, $A_2''$ allow beam steering in one direction (i.e., elevation) within the limits of the native beam "tilt" of $+/-\Phi_S$.

In the extreme steering conditions $(A_1'', A_2'')=(1, 0)$ and $(0, 1)$ the half-power beam widths (HPBW) are set by the characteristics of the individual sub-arrays only. The since-approximation is used for the beam shape in the vicinity of the peak. HPBW is defined as the spread between the angles on either side of the peak where the power density has reduced to one-half of peak. This leads to:

$$\text{sinc}^2(M(\Phi_{HP} - \Phi_S)) =$$

$$1/2 \xrightarrow{\Phi = \frac{k_0 d_x}{2} \sin \phi} \sin \phi_{HP1,2} = \sin \phi_S \pm \frac{2}{Mk_0 d_x} \text{sinc}^{-1}(1/\sqrt{2})$$

$$HPBW = (\phi_{HP1} - \phi_{HP2}) \approx \sin^{-1}\phi_{HP1} - \sin^{-1}\phi_{HP2} = \frac{4}{Mk_0 d_x} \text{sinc}^{-1}(1/\sqrt{2})$$

For the common case of $d_X=\lambda/2$ spaced elements, the following is obtained:

$$(d_x = \lambda/2): HPBW \xrightarrow{k_0 d_x = \pi} \frac{4 \cdot 1.3916}{\pi M} \approx \frac{\sqrt{\pi}}{M}.$$

Combined Beam Width

In the center-steering condition $(A_1'', A_2'')=(1, 1)$, the resulting beam can be an equal-weighted sum of the individual sub-arrays' beams symmetric around $\varphi=0$, and the pattern peak at $\varphi=0$ is $(2 \text{sinc}(M\varphi_S))^2$.

For the HPBW in this case, a solution is needed for $[\text{sinc}(M(\Phi_{HP}-\Phi_S))+\text{sinc}(M(\Phi_{HP}+\Phi_S))]^2=(2 \text{sinc}(M\Phi_S))^2/2$, which does not have an apparent algebraic solution. The numeric solution can be used as an input to:

$$HPBW =$$

$$\phi_{HP1} - \phi_{HP2} \approx \sin \phi_{HP1} - \sin \phi_{HP2} \xrightarrow[\text{around } \phi=0]{\text{symmetric}} \sin \phi_{HP} = \frac{(2M\Phi_{HP})}{Mk_0 d_x}.$$

When the individual sub-array steering angle becomes much larger than the sub-array HPBWs, the combined beam will bifurcate from having a single pattern peak to having 2 peaks.

A particularly useful condition for the native sub-array beam tilt is when the equivalent isotropically radiated power (EIRP) of the 11-combined beam is equal to the EIRP of the individual beams for an native beam tilt of $\varphi_{S,EIRP}$:

$$[\text{sinc}(-M\Phi_S) + \text{sinc}(M\Phi_S)]^2 =$$

$$1 \rightarrow M\Phi_{S,EIRP} = \frac{Mk_0 d_x}{2} \sin \phi_{S,EIRP} = \text{sinc}^{-1}(1/2) \approx 1.895.$$

Other native beam steering angles may be useful, such as the 11-combined-beam pattern is maximally flat, i.e. the pattern has zero curvature at the center ($\varphi=0$), which leads to the condition:

$$f(x) = 2x \cos x + (x^2 - 2)\sin x = 0,$$

$$\text{where } x = M\Phi_{S,flat} = \frac{Mk_0 d_x}{2} \sin \varphi_{S,flat} = 2.082.$$

A combined beam can be steered using the steering weights/amplitudes $(A_1'', A_2'')$. It is already established that the steering range extremes $\Phi_{Steered}=+/-\Phi_S$ are obtained for $(A_1'', A_2'')=(0,1)$ or $(1,0)$ and $\Phi_{Steered}=0$ for $(A_1'', A_2'')=(1, 1)$. With the equal-EIRP-across-steering-range being the most desirable condition, we determine the required ratio $A_1''/A_2''$ in the vicinity of $M\Phi_S=1.9$. In more detail, steering from $[0, \ldots, +\varphi_S]$ will use $(A_1''=1, A_2''=\text{variable})$ and steering from $[-\varphi_S, \ldots, 0]$ will use $(A_1''=1, A_2''=\text{variable})$.

As a refinement, the equal-EIRP condition at $M\Phi_S=1.895$ leads to equal EIRP at the extremes and in the center of the steering range, but a lower EIRP at all other angles. In practice, it may be advantageous to balance the deviation from EIRP=0 dB across the entire steering range.

In summary, the overall steering range $\text{SRNG}=2\phi_S \approx 2 \sin \phi_S=4\cdot(M\Phi_S/Mk_0d_x)=4\cdot(1.8, \ldots, 1.9, \ldots, 2.0)/Mk_0d_x$ is compared to the half power width of the starting beams $\text{HPBW}=2\phi_{HP} \approx 2 \sin \phi_{HP}=4\cdot(M\Phi_{HP}/Mk_0d_x)=4\cdot(1.39)/Mk_0d_x$ to show that, in a nominal scenario, $\text{SRNG} \sim 1.3$ to 1.4-times HPBW. This method is therefore useful for narrow steering range in one direction (e.g. elevation), while conventional, otherwise unconstrained steering in the orthogonal direction (e.g. azimuth) remains.

Array Design

The unique feature in the low-complexity steering approach is that the steering range (SRNG) and aperture size are connected via the half-power beam width (HPBW) of the two interleaved apertures. As shown earlier, when steered with fixed magnitudes of $(A_1'', A_2'')$, there will be a slight variation in EIRP, even in the balanced case. This can be compensated for by adjusting as a function of the combined steering angle $(A_1''(\varphi), A_2''(\varphi))$. Furthermore, it is understood that the individual apertures may have non-uniform illumination (are "tapered"), e.g. for purposes of side lobe control, beam shape design, or the like. It is understood that the design procedure here does not substantially change, however, parameter values will be different in such cases. The following design procedure will consider uniform illumination and fixed magnitudes so that the EIRP-balanced condition is assumed to be $M\Phi_S=1.8$.

Once a required steering range SRNG is decided upon, the native steering angle $+\varphi_S$ computes as follows:

$$\text{SRNG}=2\phi_S \approx 2 \sin \phi_S=4\cdot(M\Phi_S/Mk_0d_x)=4\cdot(1.8)/Mk_0d_x \text{ [rad]}.$$

The product of number-of-elements M and element spacing $d_X$ can be decided. While only the product $Md_X$ matters as a design parameter, it may nevertheless be advantageous to minimize the number of elements by maximizing $d_X$. The largest element spacing can be selected which allows for the required steering range without incurring grating lobes, i.e. only one pattern peak will appear over the entire steering range. From uniform array analysis, the following relationship is obtained:

$$\frac{d_x}{\lambda_0} \leq \frac{1-1/M}{1+\sin \phi_S} < \frac{1}{1+\sin \phi_S}.$$

It can be observed that the less stringent condition on the right avoids the full power of the grating lobe, but part of the lobe will still be visible. The more stringent condition reduces the maximum element spacing by $(1-1/M)$ and thereby avoids the grating lobe altogether. The first null adjacent to the grating lobe is placed at $\varphi=\pi/2$ when steered to $\varphi_S$. With $\varphi_S$ and $d_X$ determined, the number of elements M is then also known.

To obtain the desired steering angle $\varphi_S$ with elements spaced at $d_X$, the phase increment between adjacent elements needs to be designed to satisfy:

$$\Delta(\text{element-phase})=k_0 d_x \sin \phi_S \text{ [rad]}.$$

Hence, in a series fed array in which strings are arranged in columns, the phase-difference between the driving signals on adjacent elements, measured at the phase center of the elements will be $k_0 d_X \sin \varphi_S \pmod{2\pi}$ to obtain a pattern peak into the $\varphi_S$-direction. The phase delay on the transmission path (-line, -waveguide, etc.) between the elements should be adjusted accordingly.

The half-power beam with for the individual sub-apertures is:

$$\text{HPBW} \approx \frac{4}{Mk_0 d_x} \text{sinc}^{-1}(1/\sqrt{2}) = \frac{5.57}{Mk_0 d_x} \text{ [rad]}.$$

Design Example

A composite array can be designed with a steering range of 10 deg. ($=\pm 5$ deg.), i.e. $\varphi_S=0.087$ rad. With $M\Phi_S=1.8$, the following is obtained: $Md_X=1.8\lambda_0/(\pi\varphi_S)=6.57\lambda_0$. Assuming that the number of antenna elements (M) is 8, $d_X=0.82\lambda_0$, and $(1-1/M)/(1+\sin \varphi_S)=0.80$, which sufficiently suppresses the grating lobe in particular after multiplication with the element pattern. With that, a phase advance between adjacent elements is 25.7 degrees. The resulting sub-aperture HPBW is 7.7 degrees.

Multiple Simultaneous Beams from Interleaved Apertures

The interleaved aperture beam steering method has been analyzed in terms of one single beam. In extension, multiple simultaneous beams are equally possible. The main difference between M*N element conventional, full arrays and the 2*N low complexity method disclosed herein is that the per-element steering vector weights are replaced by the two "steering amplitudes" $(A_1'', A_2'')$ for the native beams $(+\varphi_S, -\varphi_S)$, as can be seen in the following comparison for single beams:

Conventional Single Beams:

$$e^{ik_0(md_x \sin \alpha + nd_y \sin \beta)}, \text{ where } n=[0,(N-1)], m=[0,(M-1)].$$

Low-Complexity Single Beams:

$$e^{ik_0(nd_y \sin \beta)} \cdot \left(A_1'' \cdot [\overrightarrow{+\phi_S}] + A_2'' \cdot [\overrightarrow{-\phi_S}]\right),$$

where $n = [0, (N-1)], A_1'' \in [0, 1], A_2'' \in [0, 1]$.

The number of coefficients is reduced from M×N (conventional) to 2×N (low complexity), and the $[+\varphi_S]$, $[-\varphi_S]$ notation indicates the native steered beams.

For multiple simultaneous beams $q=[1, \ldots, Q]$, with relative amplitudes $E_q$, linear superposition applies in the same fashion as in the conventional case, yielding the following comparison:

Conventional Q-Multiple Beams:

$$\Sigma_{q=1}^Q E_q e^{ik_0(md_x \sin \alpha_q + nd_y \sin \beta_q)},$$

where $n=[0, (N-1)], m=[0, (M-1)]$.

Low-Complexity Q-Multiple Beams:

$$\sum_{q=1}^{Q} E_q l^{ik_0(nd_y \sin \beta_q)} \cdot \left( A''_{1,q} \cdot [\overrightarrow{+\phi_S}] + A''_{2,q} \cdot [\overrightarrow{-\phi_S}] \right),$$

where $n = [0, (N-1)]$, $A''_{1,q} \in [0, 1]$, $A''_{2,q} \in [0, 1]$.

The number of coefficients is reduced from Q*M*N (conventional) to Q*2*N (low complexity), and the $[+\varphi_S]$, $[-\varphi_S]$ notation again indicates the native steered beams.

Combined Null Steering

The previous analysis focused on steering the combined beam pattern peak as it is instrumental for highest system gain in communications or angle resolution in radar applications. However, it may also be advantageous to steer a combined pattern null within the aperture's field-of-view, which can be useful in direction-of-arrival (DoA) finding applications. In one embodiment, a possible process for combined null steering may involve the following steps:

steer the combined pattern peak in a particular target direction (via the dependencies already shown);

measure a received signal strength ($RSSI_{Peak}$);

steer the combined pattern null in the same target direction;

measure a received signal strength ($RSSI_{Null}$); and determine the ratio $\rho = RSSI_{Null}/SSI_{Peak}$ and iterate target direction until $\rho$ becomes minimum.

Alternatively, it may be possible under certain conditions to only measure $RSSI_{Null}$ under variations of the target direction to conclusively determine DoA of a desired signal.

As noted earlier, the combined field pattern from the two interleaved, equal-but-opposite steered sub-apertures scales as:

$$E_{tot} \propto ([A_1'' \operatorname{sinc}(M(\Phi-\Phi_S)) + A_2'' \operatorname{sinc}(M(\Phi+\Phi_S))]$$

When $(A_1'', A_2'')$ have equal sign, the individual patterns will add in the combined pattern. On the other hand, when $(A_1'', A_2'')$ have opposite sign, the patterns will subtract in the region of the individual sub-aperture peaks. For example, when $(A_1'', A_2'') = (1,1)$, a broadside pattern peak forms due to symmetry of the sub-aperture patterns. When $(A_1'', A_2'') = (1,-1)$ or $(-1,1)$, due to the same symmetry argument, the sum pattern will show a null in broadside direction. Furthermore, when e.g. $A_1''=1$ and $A_2''=$variable, it is intuitive that the angle at which the sum pattern has a zero can be varied. The following analysis will focus on the null locations in more detail.

Single-Beam Null

When only one sub-aperture is illuminated, we are interested in the angle of the null closest to broadside direction (i.e. the 1$^{st}$ null towards $\Phi=0$):

$$\operatorname{sinc}(M\Phi \mp M\Phi_S) = 0 \xrightarrow{\text{1st zero towards } \Phi=0} M\Phi_{null} = \pm (M\Phi_S - \pi).$$

For the sub-aperture beam at $+M\Phi_S$, the null occurs at $M\Phi_{null} = M\Phi_S - \pi$, and, as before, the actual null angle is calculated from:

$$\sin(\phi_{null}) = \frac{2}{Mk_0 d_x}(M\Phi_S - \pi).$$

The spacing between the single beam nulls defines the combined-pattern null steering range as $2*(\pi - M\Phi_S)$, which is typically smaller than the combined-pattern beam steering range $2*M\Phi_S$. Under the balanced EIRP condition $2*M\Phi_S \sim 3.6$, whereas $2*(\pi - M\Phi_S) \sim 2.7$. Beam and null steering ranges can be made equal under the condition $M\Phi_S = \pi/2$, which sacrifices some of beam steering range (13% vs. the $M\Phi_S = 1.8$ case).

Combined-Beam Null

For the combined beam null location, $A_1'' \operatorname{sinc}(M(\Phi - \Phi_S)) + A_2'' \operatorname{sinc}(M(\Phi + \Phi_S)) = 0$, there is no general closed form solution. An approximation can be used based on the insight that for $(A_1'', A_2'')$ of approximately equal magnitude, the combined null will be close to broadside, i.e. $M\Phi_{null}$ will be small. An approximation for small $M\Phi$ yields:

$$M\Phi_{null} \big|_{small \, \Phi_{null}} \approx \frac{A_1'' + A_2''}{A_1'' - A_2''} \cdot \left[ \frac{M\Phi_S \tan M\Phi_S}{M\Phi_S - \tan M\Phi_S} \right].$$

The approximation works well even for null angles close to the single beam null. Accuracy can be further improved by replacing the term in the square brackets [ . . . ] with the single-beam null angle:

$$M\Phi_{null} \big|_{approx.} \approx \frac{A_1'' + A_2''}{A_1'' - A_2''} \cdot [M\Phi_S - \pi].$$

Null Steering Example

Returning to the earlier example array with a beam steering range of 10 deg. ($=\pm5$ deg.), $\varphi_S=0.087$ rad and $M\Phi_S=1.8$. Assuming that $M=8$, $d_x=0.82\lambda_0$, which sufficiently suppresses grating lobes over the entire $\pm 90$ deg. viewing range. The resulting sub-aperture HPBW is 7.7 deg.

An exemplary device using the low complexity phased array method disclosed herein may utilize either of the common beam steering architectures, including RF beam steering using analog gain-controllable amplifiers and phase shifters in the RF signal path; IF beam forming using analog gain-controllable amplifiers and phase shifters in the signal path at an intermediate frequency; and digital beam forming using digital signal processing prior to (TX) or after (RX) digital/analog conversion, either at baseband frequencies (zero-IF RX/TX) or at an intermediate, digital IF.

Figure 17:
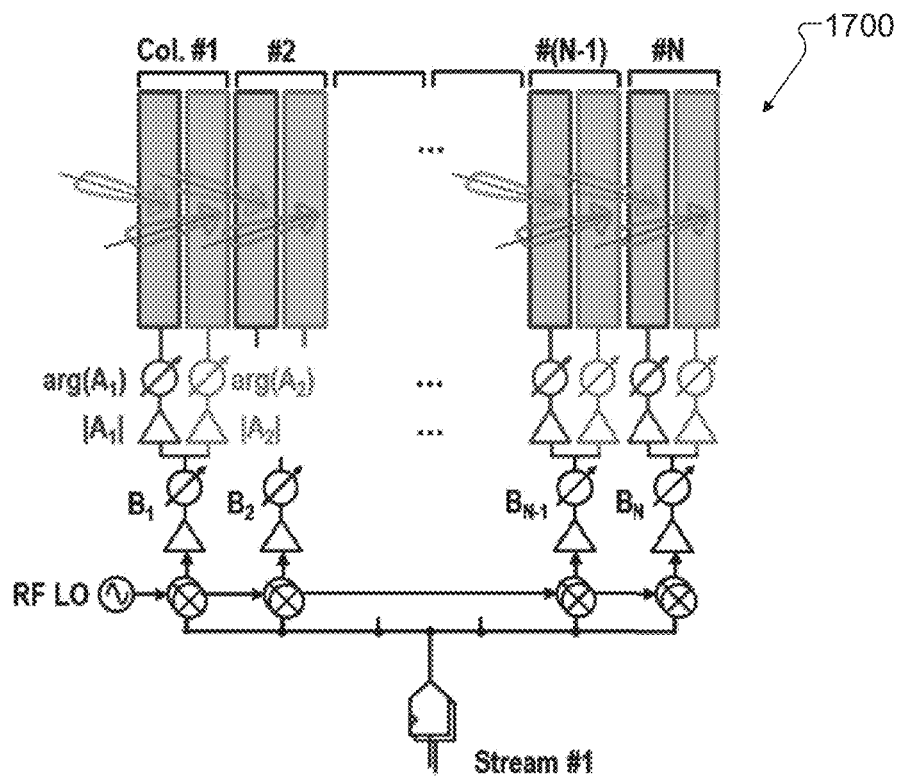
FIG. 17 illustrates a front-end module for radio frequency beamforming according to various embodiments of this disclosure.

FIG. 17 illustrates a transceiver for radio frequency beamforming according to various embodiments of this disclosure. The transceiver 1700 can be included in an electronic device such as transceiver 310 in electronic device 300 in FIG. 3. The transceiver 1700, which can be implemented in the mm-wave frequency for a transmitter, includes a composite array formed from a first antenna array with antenna elements interleaved with antenna elements of a second antenna array.

Antenna elements of the first array and the second array are elongated and arranged in columns so that the low-complexity steering angle is in the elevation direction between the native beam steering angles that coincide with the beam patterns shown emanating from each antenna element. Receiver implementation is in analogy.

Low complexity steering in the elevation direction is accomplished with first driving signals and second driving signals using a set of complex coefficients [$(A_1, A_2)1, (A_1, A_2)2, \ldots (A_1, A_2)N$]. Azimuth steering is done conventionally with the complex coefficients [B1, B2, . . . BN]. With particular reference to the transceiver in FIG. 17, a baseband signal is upconverted to a high-frequency signal and a first set of amplitudes and phases (i.e., complex coefficients B1, B1 . . . BN) is generated for steering a beam orthogonally to the first native beam steering angle and the second native beam steering angle. A second set of amplitudes and phases (i.e., complex coefficients (A1, A2)1, (A1, A2)2, . . . (A1, A2)N) is generated for the high-frequency signal for steering the radar beam between the first native beam steering angle and the second native beam steering angle. The second set of amplitudes and phases are applied to the first driving signals and the second driving signals to control a relative amplitude and phase between a first sub-aperture and a second sub-aperture of the composite array in transceiver 1700. The high-frequency signal is then sent to the composite array.

Figure 18:
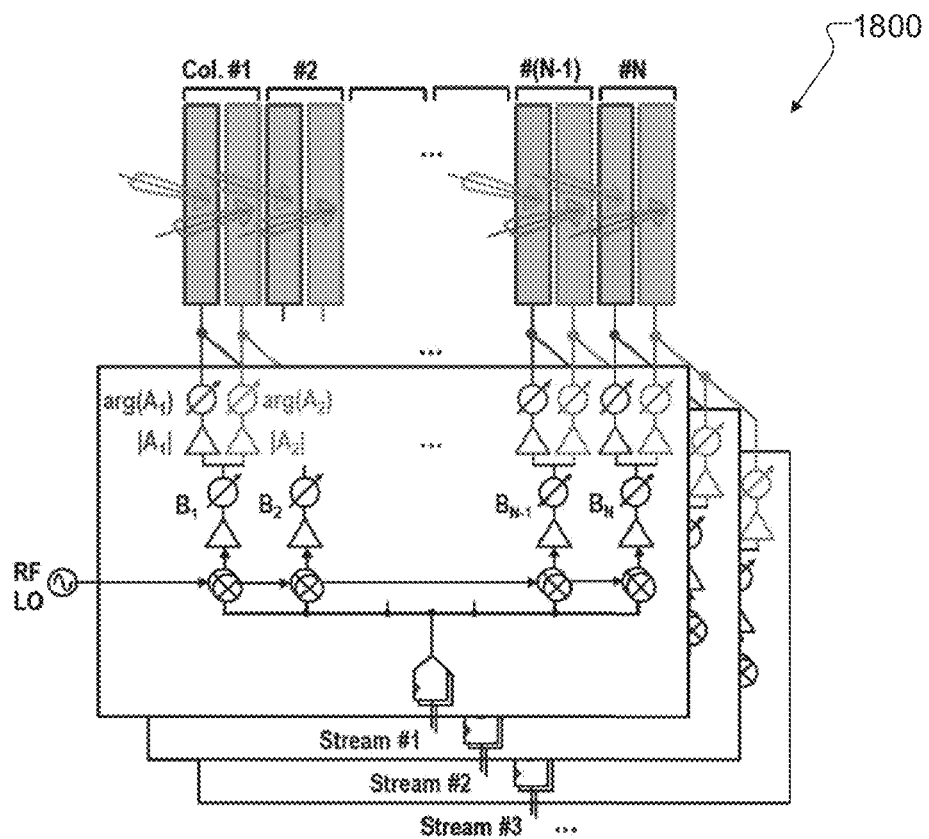
FIG. 18 illustrates a front-end module for hybrid radio frequency (RF) beamforming according to various embodiments of this disclosure.

FIG. 18 illustrates a transceiver for hybrid radio frequency (RF) beamforming according to various embodiments of this disclosure. The transceiver 1800 can be implemented in an electronic device, such as transceiver 310 in electronic device 300 in FIG. 3. The transceiver 1800 includes a composite array formed from a first antenna array with antenna elements interleaved with antenna elements of a second antenna array.

Antenna elements of the first array and the second array are elongated and arranged in columns so that the low-complexity steering angle is in the elevation direction between the native beam steering angles that coincide with the beam patterns shown emanating from each antenna element. Receiver implementation is in analogy.

Hybrid RF beamforming is an extension of single-beam RF beamforming in that several simultaneous streams of transmit data require additional, parallel RF paths that are summed at the inputs of the antenna columns (or the power amplifiers directly in front), otherwise the method is the same as described with reference to FIG. 17 above. This transmission method is used in conjunction with conventional phased arrays, for example in current state-of-the-art 5G mm-wave base station radios, as it strikes a compromise between analog complexity and the number of simultaneous beams required. However, this approach is rendered unsuitable for all but very few simultaneous beams.

Figure 19:
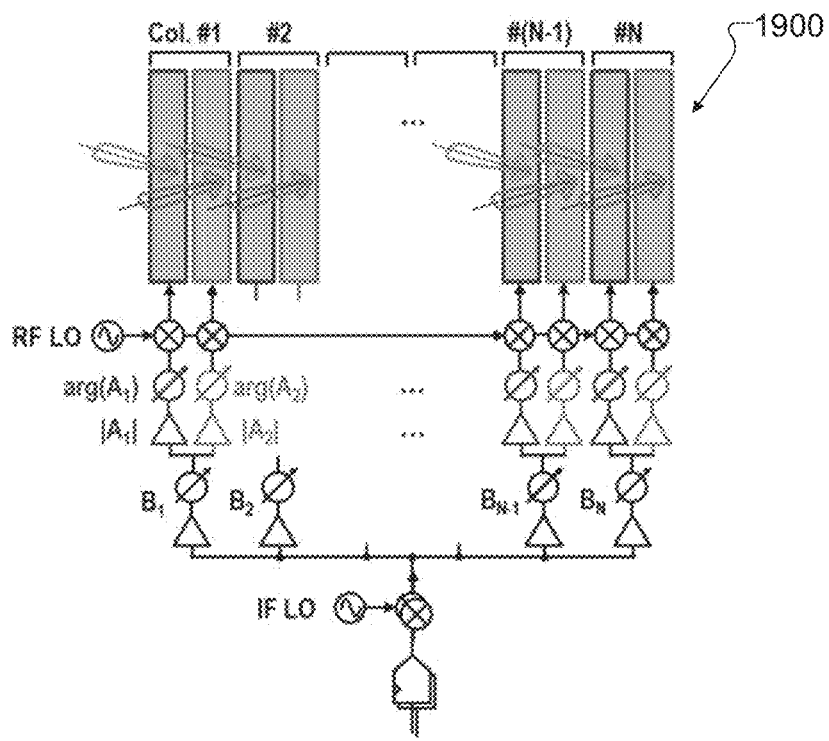
FIG. 19 illustrates a front-end module for intermediate frequency (IF) beamforming according to various embodiments of this disclosure.

FIG. 19 illustrates a transceiver for intermediate frequency (IF) beamforming according to various embodiments of this disclosure. The transceiver 1700 can be included in an electronic device such as transceiver 310 in electronic device 300 in FIG. 3.

The depicted embodiment implements the signal scaling operations needed for beam forming at an intermediate frequency. The underlying radio architecture is super-heterodyne, where baseband signals are up-/down-converted between baseband quadrature signals and an intermediate frequency. This IF is chosen such that a more advantageous implementation can be obtained, measured in parameters of power, performance, cost, etc.

Antenna elements of the first array and the second array are elongated and arranged in columns so that the low-complexity steering angle is in the elevation direction between the native beam steering angles that coincide with the beam patterns shown emanating from each antenna element. Receiver implementation is in analogy.

Low complexity steering in the elevation direction is accomplished with first driving signals and second driving signals using a set of complex coefficients [(A1, A2)1, (A1, A2)2, . . . (A1, A2)N]. Azimuth steering is done conventionally with the complex coefficients [B1, B2, BN]. With particular reference to the transceiver in FIG. 19, a baseband signal is upconverted to an intermediate-frequency signal. A first set of amplitudes and phases (i.e., complex coefficients B1, B1 . . . BN) is generated for the intermediate-frequency signal for steering a radar beam orthogonally to the first native beam steering angle and the second native beam steering angle. A second set of amplitudes and phases (i.e., complex coefficients (A1, A2)1, (A1, A2)2, . . . (A1, A2)N) is generated for the intermediate-frequency signal for steering the radar beam between the first native beam steering angle and the second native beam steering angle. The second set of amplitudes and phases are applied to the first driving signals and the second driving signals to control a relative amplitude and phase between a first sub-aperture and a second sub-aperture of the composite array in transceiver 1800. Thereafter, the intermediate-frequency signal is upconverted to a high-frequency signal and sent to the composite array.

In the basic IF beam forming diagram, azimuth and elevation control are done at the intermediate frequency. This may be advantageous as the amplitude and phase scaling circuit can be re-used for azimuth (once) and elevation (twice). Implementation at the lower frequency typically leads to higher accuracy, repeatability and lower power.

Figure 20:
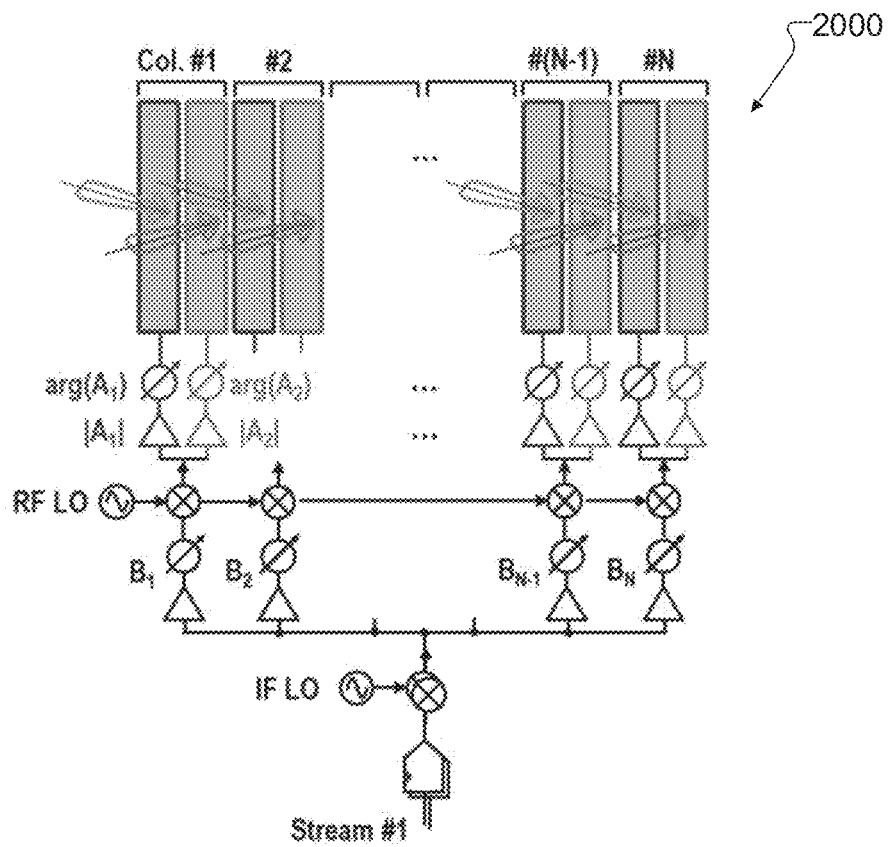
FIG. 20 illustrates a front-end module for split IF/RF beamforming according to various embodiments of this disclosure.

FIG. 20 illustrates a transceiver for split IF/RF beamforming according to various embodiments of this disclosure. The transceiver 2000 can be implemented in an electronic device, such as transceiver 310 in electronic device 300 in FIG. 3. The transceiver 2000 includes a composite array formed from a first antenna array with antenna elements interleaved with antenna elements of a second antenna array.

Antenna elements of the first array and the second array are elongated and arranged in columns so that the low-complexity steering angle is in the elevation direction between the native beam steering angles that coincide with the beam patterns shown emanating from each antenna element. Receiver implementation is in analogy.

Low complexity steering in the elevation direction is accomplished with first driving signals and second driving signals using a set of complex coefficients [(A1, A2)1, (A1, A2)2, . . . (A1, A2)N]. Azimuth steering is done conventionally with the complex coefficients [B1, B2, BN]. With particular reference to the transceiver in FIG. 20, a baseband signal is upconverted to an intermediate-frequency signal and a first set of amplitudes and phases (i.e., complex coefficients B1, B1 . . . BN) is generated for steering a radar beam orthogonally to the first native beam steering angle and the second native beam steering angle. The intermediate-frequency signal is upconverted to a high-frequency RF signal and then a second set of amplitudes and phases (i.e., complex coefficients (A1, A2)1, (A1, A2)2, . . . (A1, A2)N) is generated for the high-frequency signal for steering the radar beam between the first native beam steering angle and the second native beam steering angle. The second set of amplitudes and phases are applied to the first driving signals and the second driving signals to control a relative amplitude and phase between a first sub-aperture and a second sub-aperture of the composite array in transceiver 2000. The high-frequency signal is then sent to the composite array.

The exemplary transceiver depicted in FIG. 20, which has azimuth steering coefficients implemented at IF and elevation coefficients implemented at RF, uses a lower number of IF-RF mixers as compared to the transceiver in FIG. 19. However, additional circuitry is needed at RF. In another embodiment, azimuth control can be implanted at RF and elevation control can be implemented at IF, however this embodiment requires two sets of circuits for the B-coefficients, which is inefficient and reduces accuracy due to imperfect matching between the pairs.

Figure 21:
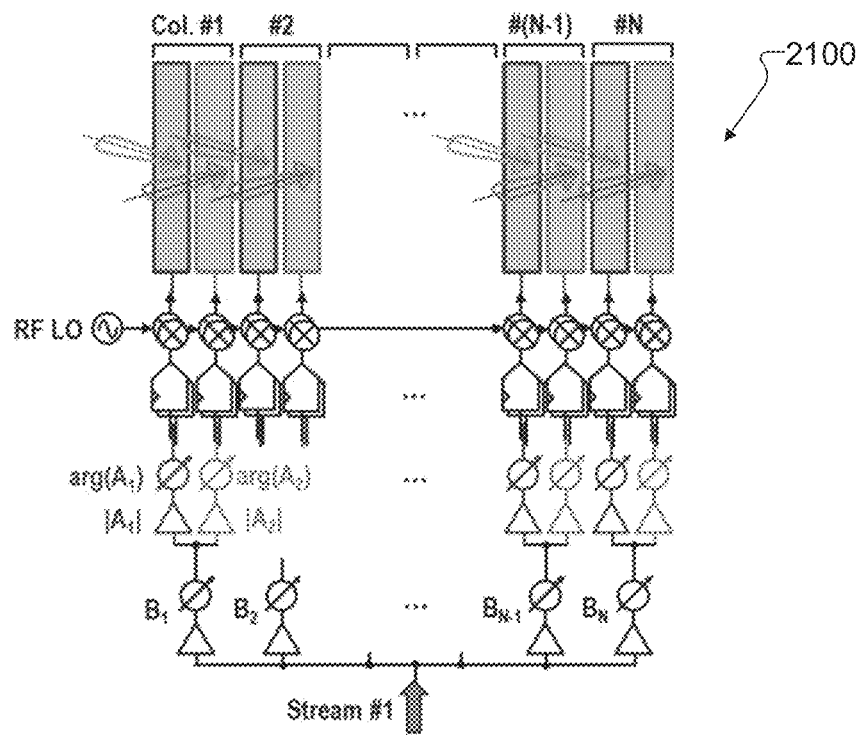
FIG. 21 illustrates a front-end module for digital beamforming according to various embodiments of this disclosure.

FIG. 21 illustrates a transceiver for digital beamforming according to various embodiments of this disclosure. The transceiver 2100 can be implemented in an electronic device, such as transceiver 310 in electronic device 300 in FIG. 3. The transceiver 2100 includes a composite array formed from a first antenna array with antenna elements interleaved with antenna elements of a second antenna array.

Antenna elements of the first array and the second array are elongated and arranged in columns so that the low-complexity steering angle is in the elevation direction between the native beam steering angles that coincide with the beam patterns shown emanating from each antenna element. Receiver implementation is in analogy.

Low complexity steering in the elevation direction is accomplished with first driving signals and second driving signals using a set of complex coefficients [(A1, A2)1, (A1, A2)2, . . . (A1, A2)N]. Azimuth steering is done conventionally with the complex coefficients [B1, B2, BN]. With particular reference to the transceiver in FIG. 21, a first set of amplitudes and phases (i.e., complex coefficients B1, B1 . . . BN) is generated for a baseband signal for steering a radar beam orthogonally to the first native beam steering angle and the second native beam steering angle. A second set of amplitudes and phases (i.e., complex coefficients (A1, A2)1, (A1, A2)2, . . . (A1, A2)N) is generated for the baseband signal for steering the radar beam between the first native beam steering angle and the second native beam steering angle. The second set of amplitudes and phases are applied to the first driving signals and the second driving signals to control a relative amplitude and phase between a first sub-aperture and a second sub-aperture of the composite array in transceiver 2100. The baseband signal is converted to analog, upconverted to a high-frequency RF signal and then sent to the composite array.

In this non-limiting embodiment, beam forming is implemented entirely in the digital domain, prior to digital-to-analog conversion in the transmitter or post analog-to-digital conversion in the receiver, respectively. The advantage of this method is the minimum complexity in the RF path at the expense of higher number of data converters.

In this architecture, the advantages of the disclosed low-complexity architecture come to full fruition. For example, an N-column by M elements/column array conventionally requires N*M data converters with associated digital signal paths. However, in this depicted embodiment only 2*N of the data converter/digital signal paths are necessary. In a conventional 16×16 array, 256 such paths are required, whereas in the currently disclosed method, only 32 are needed—almost a full order of magnitude savings in circuit cost, area, and power consumption.

Figure 22:
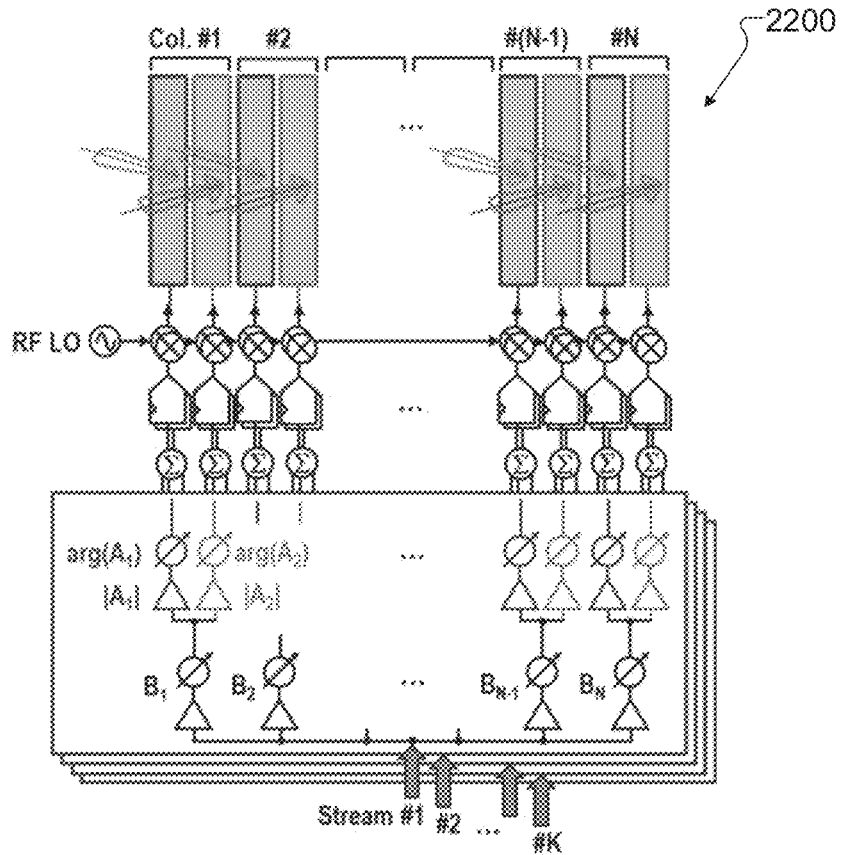
FIG. 22 illustrates a front-end module for digital, multi-beam forming for transmission according to various embodiments of this disclosure.

FIG. 22 illustrates a transceiver for digital multi-beam forming according to various embodiments of this disclosure. The transceiver 2200 can be implemented in an electronic device, such as transceiver 310 in electronic device 300 in FIG. 3. The transceiver 2200 includes a composite array formed from a first antenna array with antenna elements interleaved with antenna elements of a second antenna array.

Digital beamforming of multiple data streams in FIG. 22 is an extension of single-beam digital beamforming in FIG. 21 in that parallel data streams are summed at the digital-to-analog converter before sending to the composite array. Otherwise, the method is the same as previously described.

Figure 23:
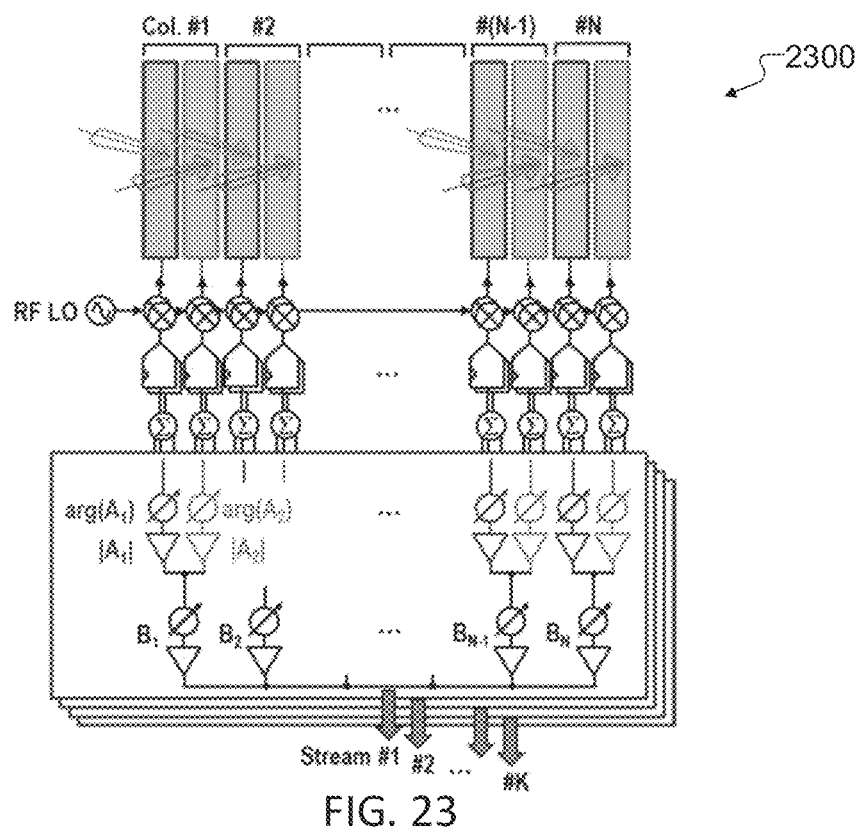
FIG. 23 illustrates a front-end module for digital, multi-beam forming for reception according to various embodiments of this disclosure.

Digital beamforming offers the further advantage that multiple data streams can be processed and combined in the digital domain without change in either the number or (significant) parameters of data converters or analog signal paths. The steering vectors A1, A2, and B, each of dimension (N×1), are instead replaced by steering matrices of dimension (N×K). FIG. 22 and FIG. 23 show transmitter and receiver block diagrams of a digital multi-beam former using the low complexity method disclosed here.

Other embodiments of radio architectures that use the disclosed low complexity beam steering innovation are readily available and will be based on the fact that any 2-dimensional beam steering angle (azimuth, elevation) can be implemented as a set of complex triplets (A1, A2, B).

FIG. 23 illustrates a receiver configured for receiving a signal for digital processing into multiple signals according to various embodiments of this disclosure. The receiver 2300 can be implemented in an electronic device, such as in transceiver 310 in electronic device 300 in FIG. 3. The receiver 2300 includes a composite array formed from a first antenna array with antenna elements interleaved with antenna elements of a second antenna array. The incoming signal is converted to a digital signal and split into a streams 1 through K and processed to identify corresponding phases and amplitudes.

Figure 24:
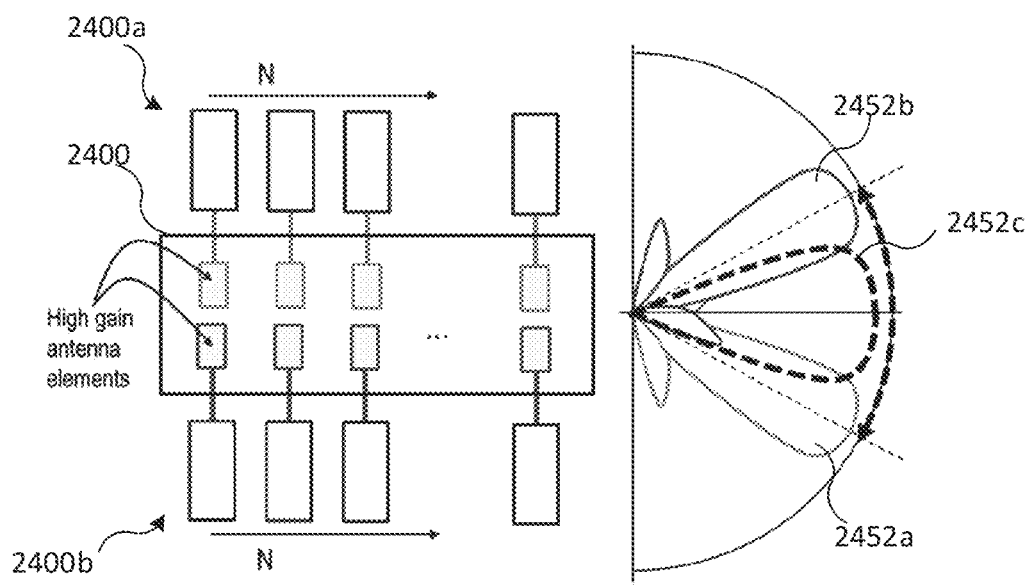
FIG. 24 illustrates a first sub-aperture, a second sub-aperture, and a combined aperture relative to a composite N×2 array according to various embodiments of this disclosure.

FIG. 24 illustrates exemplary beam patterns for a composite N×2 array according to various embodiments of this disclosure. The composite array 2400 can be implemented in a transceiver of an electronic device, such as antenna array 313 in transceiver 310 of electronic device 300 in FIG. 3.

The composite array 2400 is formed from a first N×M antenna array placed adjacent to a second N×M antenna array to form the N×2M composite array 2400 with M=1. The individual sub-arrays' beam patterns have wide steering range in one direction (e.g., in azimuth for the depicted configuration) and fixed steering angles (e.g., in elevation) in equal but opposite directions relative to a mean steering angle. In this non-limiting embodiment, the mean steering angle of the combined aperture of composite array 2400 is normal to the plane common to all of the antenna elements (e.g., broadside).

When the first array 2400a is excited, the first beam pattern 2452a is obtained. Similarly, when the second array 2400b is excited, the second beam 2452b is obtained. Symmetry around the mean broadside direction can be obtained by one sub-array being the vertically mirrored version of the other. When both arrays 2400a and 2400b are excited equally and the additional effects of offsets are accounted for, a combined beam 2452c emerges with a peak falling on the mean direction of the first beam 2452a and the second beam 2452b. It will be possible to steer the combined beam continuously between the limits of the first beam 2452a and the second beam 2452b by controlling the relative excitations of the respective sub-arrays in transmit mode, or the relative summation weights of the sub-arrays in receive mode.

If the angular separation between the first beam 2452a and the second beam 2452b are on the order of their respective beam widths, a peak in the combined beam 2452c appears when both are equally excited. If the angular separation is much larger, the first beam 2452a and the second beam 2452b will enhance each other in the combined pattern but will create a "dip" in between two peaks rather than a peak. If the separation is much less than the individual beam widths, the total steering range is less than optimum.

In the embodiment depicted in FIG. 24, the first array 2400a and the second array 2400b are N×1 arrays; however, in other embodiments each of the N strings can be series-fed columns of M antenna elements, such as series-fed strings of microstrip patch antennas, where M is an integer greater than 1.

Figure 25:
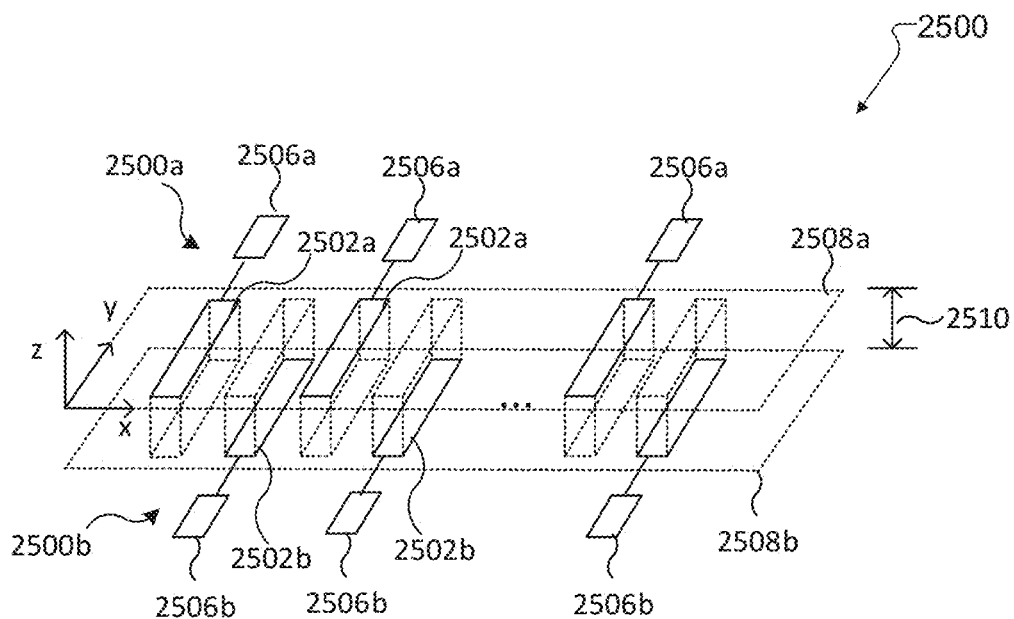
FIG. 25 illustrates an offset of antenna elements according to various embodiments of this disclosure.

FIG. 25 illustrates an offset of antenna elements according to various embodiments of this disclosure. The composite array 2500 is formed from a first array 2500a with N antenna elements 2502a interleaved with N antenna elements 2502b from a second array 2500b. Each antenna element 2502a of the first array 2500a is edge-fed by a signal processing path 2506a and each column 2502b of the second array 2500b is edge-fed by a signal processing path 2506b.

Antenna elements 2502a are arranged to define a plane 2508a and antenna elements 2502b are arranged to define a plane 2508b that is parallel to and separated from plane 2508a by a distance 2510. With particular reference to FIG. 25, a sub-aperture of the first array 2500a is offset from a sub-aperture of the second array 2500b by an offset in the x-direction and in the z-direction. In another embodiment, the offset can also include an offset in the y-direction.

Figure 26:
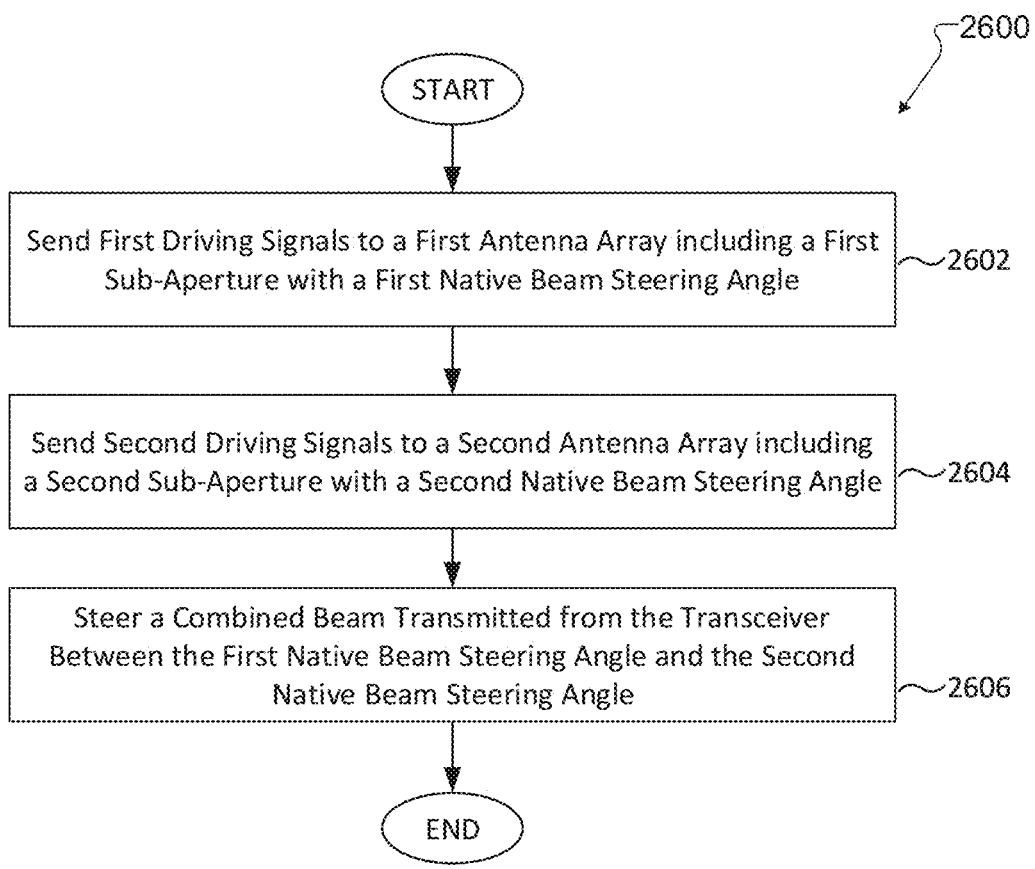
FIG. 26 is a flowchart of a process for beam steering according to various embodiments of this disclosure.

FIG. 26 is a flowchart of a process for beam steering according to various embodiments of this disclosure. The flowchart 2600 can be performed by a transceiver of an electronic device, such as transceiver 310 of electronic device 300 in FIG. 3.

The process begins at step 2602 by sending first driving signals to a first antenna array including a first sub-aperture with a first native beam steering angle. The driving signals cause a first beam pattern to be transmitted from sub-aperture in the direction of the first native beam steering angle. In step 2604, the process sends second driving signals to a second antenna array including a second sub-aperture with a second native beam steering angle. The driving signals cause a second beam pattern to be transmitted from the second sub-aperture in the direction of the second native beam steering angle.

The first antenna array and the second antenna array are arranged in the transceiver such that the first sub-aperture is combinable with the second sub-aperture to form a combined aperture when the first driving signals and the second driving signals excite the first and second antenna arrays, respectively. In other words, the first antenna array and the second antenna array are arranged in the transceiver such that a first beam pattern transmitted from the first sub-aperture is combinable with a second beam pattern transmitted from the second sub-aperture to form a combined beam when the first driving signals and the second driving signals excite the first and second antenna arrays, respectively.

If necessary, the direction of the combined beam can be steered between the first native beam steering angle and the second native beam steering angle in step 2606. Steering can be achieved by controlling a relative amplitude and phase of the first sub-aperture and the second sub-aperture. In some embodiments after step 2606; however, in other embodiments, the process returns to step 2602 and continues until a termination condition is met.

Although this disclosure has been described with an exemplary embodiment, various changes and modifications may be suggested to one skilled in the art. It is intended that this disclosure encompass such changes and modifications as fall within the scope of the appended claims.

What is claimed is:

1. A transceiver comprising:
a first antenna array including a first sub-aperture with a first native beam steering angle; and
a second antenna array including a second sub-aperture with a second native beam steering angle different than the first native beam steering angle,
wherein the first antenna array and the second antenna array are arranged in the transceiver to form combined beam, when the first antenna array and the second antenna array are excited, that is steerable between the first native beam steering angle and the second native beam steering angle based on relative amplitudes and phases of the first sub-aperture and the second sub-aperture, respectively.

2. The transceiver of claim 1, wherein the first antenna array and the second antenna array are N×M arrays with N strings of M antenna elements, and wherein N and M are non-zero integers.

3. The transceiver of claim 2, wherein adjacent antenna elements on a same string of the first antenna array are separated by a first distance, and wherein adjacent antenna elements on adjacent strings of the first antenna array are separated by a second distance, and wherein the first sub-aperture is separated from the second sub-aperture by an offset that is ½ the first distance, ½ the second distance, or both.

4. The transceiver of claim 2, wherein adjacent antenna elements on a same string of the first antenna array are separated by a first distance, and wherein adjacent antenna elements on adjacent strings of the first antenna array are separated by a second distance, and wherein the first sub-aperture is separated from the second sub-aperture by an offset that is at least ½ the first distance, at least ½ the second distance, or both.

5. The transceiver of claim 4, wherein antenna elements of the first antenna array are arranged to define a first plane, wherein antenna elements of the second antenna array are arranged to define a second plane parallel to and separated from the first plane by a third distance, and wherein the offset includes the third distance.

6. The transceiver of claim 2, wherein strings of the first antenna array are interleaved with strings of the second antenna array to form a composite 2N×M array.

7. The transceiver of claim 2, wherein the first antenna array is positioned adjacent to the second antenna array to form a composite N×2M array.

8. The transceiver of claim 2, wherein strings of the first antenna array are configured to receive first driving signals at an antenna element located at an edge of the first antenna array, and wherein strings of the second antenna array are configured to receive second driving signals at an antenna element located at an edge of the second antenna array.

9. The transceiver of claim 2, wherein strings of the first antenna array are configured to receive first driving signals between antenna elements located within an interior of the first antenna array, and wherein strings of the second antenna array are configured to receive second driving signals between antenna elements located within an interior of the second antenna array.

10. A method for beam steering in a transceiver, the method comprising:
sending first driving signals to a first antenna array including a first sub-aperture with a first native beam steering angle;
sending second driving signals to a second antenna array including a second sub-aperture with a second native beam steering angle, wherein the first antenna array and the second antenna array are arranged in the transceiver to form a combined beam, when the first driving signals and the second driving signals excite the first and second antenna arrays, respectively; and steering the combined beam transmitted from the transceiver between the first native beam steering angle and the second native beam steering angle by controlling relative amplitudes and phases of the first sub-aperture and the second sub-aperture, respectively.

11. The method of claim 10, wherein the first antenna array and the second antenna array are N×M arrays with N strings of M elements, and wherein N and M are non-zero integers.

12. The method of claim 11, wherein adjacent antenna elements on a same string of the first antenna array are separated by a first distance, and wherein adjacent antenna elements on adjacent strings of the first antenna array are separated by a second distance, and wherein the first sub-aperture is separated from the second sub-aperture by an offset that is ½ the first distance, ½ the second distance, or both.

13. The method of claim 11, wherein adjacent antenna elements on a same string of the first antenna array are separated by a first distance, and wherein adjacent antenna elements on adjacent strings of the first antenna array are separated by a second distance, and wherein the first sub-aperture is separated from the second sub-aperture by an offset that is at least ½ the first distance, at least ½ the second distance, or both.

14. The method of claim 13, wherein antenna elements of the first antenna array are arranged to define a first plane, wherein antenna elements of the second antenna array are arranged to define a second plane parallel to and separated from the first plane by a third distance, and wherein the offset includes the third distance.

15. The method of claim 11, wherein strings of the first antenna array are interleaved with strings of the second antenna array to form a composite 2N×M array.

16. The method of claim 11, wherein the first antenna array is positioned adjacent to the second antenna array to form a composite N×2M array.

17. The method of claim 11, wherein sending the first driving signals to the first antenna array further comprises sending the first driving signals to strings of the first antenna array for receipt at an antenna element located at an edge of the first antenna array, and wherein sending the second driving signals to the second antenna array further comprises sending the second driving signals to strings of the second antenna array for receipt at an antenna element located at an edge of the second antenna array.

18. The method of claim 11, wherein sending the first driving signals to the first antenna array further comprises sending the first driving signals to strings of the first antenna array for receipt between antenna elements located within an interior of the first antenna array, and wherein sending the second driving signals to the second antenna array further comprises sending the second driving signals to strings of the second antenna array for receipt between antenna elements located within an interior of the second antenna array.

* * * * *